United States Patent
Cho et al.

(10) Patent No.: US 11,044,909 B2
(45) Date of Patent: Jun. 29, 2021

(54) COMPOSITION FOR DESTRUCTION OF MICROALGAE OR SPHAEROCARPUS

(71) Applicant: CUREARTH, INC., Gwangju (KR)

(72) Inventors: Hoon Cho, Gwangju (KR); Sun Jong Yu, Yeosu-si (KR); Seung Ho Baek, Busan (KR); Hyung Joon Cha, Pohang-si (KR)

(73) Assignee: CUREARTH, INC., Gwangju (KR)

( * ) Notice: Subject to any disclaimer, the term of this patent is extended or adjusted under 35 U.S.C. 154(b) by 0 days.

(21) Appl. No.: 15/762,368

(22) PCT Filed: Aug. 18, 2016

(86) PCT No.: PCT/KR2016/009070
§ 371 (c)(1),
(2) Date: Mar. 22, 2018

(87) PCT Pub. No.: WO2017/065401
PCT Pub. Date: Apr. 20, 2017

(65) Prior Publication Data
US 2018/0271091 A1  Sep. 27, 2018

(30) Foreign Application Priority Data

Oct. 14, 2015 (KR) .................. 10-2015-0143373
Apr. 12, 2016 (KR) .................. 10-2016-0044946

(51) Int. Cl.
| | |
|---|---|
| A01N 43/40 | (2006.01) |
| A01N 33/04 | (2006.01) |
| C02F 1/50 | (2006.01) |
| A01N 33/06 | (2006.01) |
| A01N 33/08 | (2006.01) |
| A01N 37/10 | (2006.01) |
| A01N 35/04 | (2006.01) |
| A01N 35/06 | (2006.01) |
| A01N 37/18 | (2006.01) |

(52) U.S. Cl.
CPC .............. *A01N 43/40* (2013.01); *A01N 33/04* (2013.01); *A01N 33/06* (2013.01); *A01N 33/08* (2013.01); *A01N 35/04* (2013.01); *A01N 35/06* (2013.01); *A01N 37/10* (2013.01); *A01N 37/18* (2013.01); *C02F 1/50* (2013.01)

(58) Field of Classification Search
None
See application file for complete search history.

(56) References Cited

U.S. PATENT DOCUMENTS

| | | | | |
|---|---|---|---|---|
| 3,775,313 A | * | 11/1973 | Adams et al. | A01N 33/06 514/649 |
| 3,871,861 A | | 3/1975 | Merianos et al. | |
| 4,286,983 A | * | 9/1981 | Van Gilse | A01N 33/06 504/158 |
| 6,800,590 B2 | | 10/2004 | Lü et al. | |
| 2009/0203070 A1 | * | 8/2009 | Devroe | C12N 9/1007 435/69.1 |
| 2011/0280920 A1 | * | 11/2011 | Zlotkin | A61L 27/227 424/405 |
| 2015/0157014 A1 | | 6/2015 | Hani et al. | |

FOREIGN PATENT DOCUMENTS

| | | | |
|---|---|---|---|
| CN | 1347876 A | 5/2002 | |
| CN | 102007911 A | 4/2011 | |
| EP | 1059033 A1 * | 12/2000 | ............ A01N 37/44 |
| GB | 518453 A * | 2/1940 | |
| JP | 1977-090630 | 7/1977 | |
| JP | S52090630 | 7/1977 | |
| JP | S5519300 | 2/1980 | |
| JP | 1994-247804 A | 9/1994 | |
| JP | H06247804 | 9/1994 | |
| JP | H11005705 | 1/1999 | |
| JP | 2000167565 | 6/2000 | |
| JP | 2005535714 | 11/2005 | |
| JP | 2007522230 | 8/2007 | |
| JP | 2011068741 | 4/2011 | |
| JP | 2012046516 | 3/2012 | |
| JP | 2014-051480 A | 3/2014 | |
| KR | 10-2001-0041333 | 5/2001 | |
| KR | 10-2011-0132355 | 12/2011 | |
| KR | 102013006381 | 1/2013 | |
| KR | 10-2014-0105413 | 9/2014 | |
| WO | WO99/43207 | 9/1999 | |

(Continued)

OTHER PUBLICATIONS

Zodiac "Pool Algaecide" www.zodiac.com.au/pool-algaecide. Accessed wayback machine, Mar. 9, 2014 https://web.archive.org/web/20140309065859/www.zodiac.com.au/pool-algaecide, p. 1-5. (Year: 2014).*

Sadanandam et al. (Zeitschrift fuer Pflanzenkrankheiten un Pflanzenshutz, 1975, 82(3), 149-161).*

Chemiphase https://chemiphase.wordpress.com/2011/10/27/algaecide-the-safe-and-easy-way-to-remove-moss-and-algae-from-paths/, dated Oct. 27, 2011, no pagination. (Year: 2011).*

Meindl, W. A.; et al. "Benzylamines: synthesis and evaluation of Antimycobacterial properties" Journal of Medicinal Chemistry, 1984 ,27, 1111-1118. (Year: 1984).*

Environmental Leverage https://web.archive.org/web/20100228055243/https://www.environmentalleverage.com/Amines.htm, No pagination (Year: 2010).*

Blanck, H. Arch. Environ. Contam. Toxicol., 1985, 14, 609-620. (Year: 1985).*

(Continued)

*Primary Examiner* — Erin E Hirt
(74) *Attorney, Agent, or Firm* — Klarquist Sparkman, LLP

(57) ABSTRACT

The present disclosure relates to a composition for the destruction of microalgae or mosses. The composition for the destruction of microalgae or mosses may suppress the growth and proliferation of microalgae when treated in moss cultivation facilities, marine microalgae cultivation facilities, areas in which green or red tide is occurring, or areas in which green or red tide is expected to occur, thereby preventing damage caused by the green or red tide.

12 Claims, 4 Drawing Sheets

(56) References Cited

FOREIGN PATENT DOCUMENTS

WO    WO2014/047497    3/2014

OTHER PUBLICATIONS

Choi et al. (Biotechnol. And Bioprocess Engineering, 2016, 21,463-476). (Year: 2016).*

Sadanandam et al. (Zeitschrift fuer Pflanzenkrankheiten und Pflanzenschutz, 1975, 82(3), 149-161). (Year: 1975).*

Choi, I., et al., "Extraction Yield of Soluble Protein and Microstructure of Soybean Affected by Microwave Heating", Journal of Food Processing and Preservation, 30 (2006), 407-419.

Demirbas, A. et al., "Importance of algae oil as a source of biodiesel", Energy Conservation and Managment, 52 (2011), pp. 163-170.

El Hattab, M., et al., "Comparison of various extraction methods for identification and determination of volatile metabolites from brown alga *Dictyopteris embranacea*", Journal of Chromatography A, 1143 (2007), pp. 1-7.

Keith, J.M., et al., "Selective *ortho*-cleavage of methoxymethyl- and 4-methoxybenzyl ethers", Tetrahedron Letters, 45 (2004), pp. 2739-2742.

Lee, J.-Y., et al., "Comparison of several methods for effective lipid extraction from microalgae", Bioresource Technology, 101 (2010), pp. 575-577.

Miao, X., et al., "High yield bio-oil production from fast pyrolysis by metabolic controlling of *Chlorella protothecoides*", Journal of Biotechnology, 110 (2004) pp. 85-93.

World Intellectual Property Organization, Search Report and Written Opinion, dated Nov. 14, 2016, for PCT/KR2016/009070.

Ross, W.F., et al., "Synthesis and antifungal activity of five classes of diamines", Pest Management Science, 60 (2004), pp. 143-148.

Samori, C., et al., "Extraction of hydrocarbons from microalga *Botryococcus braunli* with switchable solvents", Bioresource Technology, 101 (2010), pp. 3274-3279.

Zecchina, A., et al., "Selective Catalysis and Nanoscience: An Inseparable Pair" Chemistry A European Journal 13 (2007), pp. 2440-2460.

Choi et al., "Synthesis and Algicidal Activity of New Dichlorobenzylamine Derivatives against Harmful Red Tides," *Biotechnology and Bioprocess Engineering*, 21(3):463-476 (Jun. 2016.).

Office Action for Japanese Patent Application No. 2018-534449, dated Mar. 26, 2019 (with machine-translation).

Partial Supplementary European Search Report for European Patent Application No. 16855619.9, dated Mar. 1, 2019.

Office Action for Chinese Patent Application No. 201680059534.9, dated May 8, 2020 (with English translation).

Office Action for Indonesian Patent Application No. PID 2018 02533, dated Apr. 16, 2020 (with machine translation).

\* cited by examiner

COMPOSITION FOR DESTRUCTION OF MICROALGAE OR SPHAEROCARPUS

TECHNICAL FIELD

The present disclosure relates to a composition for destruction of microalgae or mosses.

BACKGROUND ART

Microalgae as photosynthetic aquatic unicellular organisms are commonly referred to as phytoplankton. Currently, active efforts are ongoing worldwide to utilize microalgae industrially. Microalgae may be used for wastewater treatment, immobilization of carbon dioxide, and the like, due to their diverse abilities, and have been used for production of useful materials such as fuel materials, cosmetics, feed, food coloring materials, and medicinal raw materials, while their fields of application have been widened due to the continuous discovery of useful value-added materials from microalgae.

Microalgae, as a biological resource which is free of the criticism on the use of food resources for energy production, may generate biofuels having similar physical properties to petroleum diesel. An energy conversion process for producing biodiesel from microalgae involves production and harvest of microalgae biomass, a process of oil extraction from the microalgae biomass, and a transesterification reaction of the extracted oil. In particular, the process of oil extraction from microalgae, which is controversial due to its high cost, is regarded as a bottleneck in high lipid productivity and biodiesel production. Accordingly, an efficient oil extraction apparatus and method are required prior to the production of biodiesel from microalgae.

On the other hand, microalgae also include harmful algae which result in abnormal proliferation of algae such as that of a green tide or red tide phenomenon. Green tide refers to a phenomenon in which the color of water turns into a prominent green color due to overproliferation and aggregation of floating algae, i.e., phytoplankton, on the water surface of a eutrophic lake or a river with a slow stream. In general, this green tide occurs only in freshwater, and may be caused by the inflow of various land pollutants such as industrial wastewater, domestic sewage, fertilizers, pesticides, and livestock and human manure, into a river or lake, wherein these pollutants are deposited in the lower portion of the body of water and decomposed by bacteria into organic matter, which then generates nitrogen and phosphorus which is fed on by plankton, thus causing green tide in seawater and fresh water. Such green tide may reduce dissolved oxygen in water, and generate toxic algae and various green plankton, killing fish and aquatic organisms. Furthermore, heavy metals deposited at the bottom of the waters may flow in the waters to thereby contaminate fresh water and poison fish, further causing other problems such as environmental destruction and damage to natural aesthetics. Organisms that cause green tide are green algae, diatoms, blue-green algae, and phytomastigophora. Of these organisms, blue-green algae are the main cause of green tide. On the other hand, red tide refers to a phenomenon in which the color of seawater turns red, reddish brown, tan, green, yellow-green, or yellow due to abnormal proliferation of plankton caused by massive inflows of organic contaminants, nitrogen, phosphorus, and the like from land. Organisms which cause such red tide are mainly flagellates and diatoms.

Such green tide and red tide caused by harmful algae may rapidly lead to an oxygen-deficient condition in the sea, due to the depletion of dissolved oxygen in the water, which consequently results in the mass death of fish and shellfish. Overproliferated plankton may adhere to the gills of fish such as to choke the fish. Flagellates such as *Cochlodinium* may generate harmful toxins which kill fish. Currently, about 50% of animal proteins consumed by about two billion of the world's population are supplied from the sea. Accordingly, the destruction of marine ecosystems by red tide may have a serious impact on such food resources, deteriorating the utility value of waters, and further raising more serious environmental issues beyond economic values.

As described above, microalgae may not only generate bioenergy but may also mitigate harmful environmental problems. To utilize such microalgae, there is required an oil extraction process for destruction of the cell membranes of microalgae to increase yield of extracted intracellular lipids. Typical oil extraction methods used so far are a solvent extraction method (Chiara Samori et al., Bioresource Technology, 101: 3274, 2010), a Soxhlet extraction method (Ayhan Demirbas a and M. Fatih Demirbas, Energy Conversion and Management, 52(2011):163, 2011), a supercritical extraction method (Mohamed El Hattab et al., Journal Chromatography A, 1143:1, 2007), an osmotic impact method (Jae-Yon Lee et al., Bioresource Technology, 101:575, 2010), an electromagnetic wave and sonic extraction method (Choi I et al., Journal of Food Processing and Preservation 30 (2006) 407-419) a cracking or hydrocracking method (Zecchina A et al., Chem A Eur J. 13:2440, 2007), and a pyrolysis method (Miao X and Wu Q, Biotechnol, 110:85, 2004).

However, these methods have drawbacks such as low extraction yield, high operation costs, complexity, and the like. Accordingly, for efficient oil extraction from microalgae, it is necessary to develop a simpler, more efficient pretreatment method.

For mosses, various nitrogen compounds may be generated from dead mosses, and mass proliferation of mosses may also cause green tide. Mosses may adhere to glass or walls, causing aesthetic unpleasantness in an aquarium, an exhibition hall, and the like, while deteriorating the water quality and functionality of a household water tank or industrial facilities such as a large water tank, a water storage tank, or an aquafarm. Therefore, it is also necessary to manage mosses in order to prevent and eliminate mosses.

Accordingly, the inventors of the present disclosure found that a benzylamine compound, a benzamide compound, and/or a phenyl propenone compound, each having a specific substituent, may have an effect of destroying the cell membranes of microalgae, thus completing the present invention.

SUMMARY OF INVENTION

Technical Problem

The present disclose provides a composition for destroying microalgae or mosses, and a method of destroying microalgae or mosses by using the composition, wherein the composition includes a benzyl amine compound, a benzamide compound, and/or a phenyl propenone compound, each having a microalgae or mosses destruction effect.

Solution to Problem

According to an aspect of the present disclosure, there is provided a composition for destroying microalgae or mosses, wherein the composition includes a compound represented by one of Formulae 1 to 3 or a salt thereof as an active ingredient.

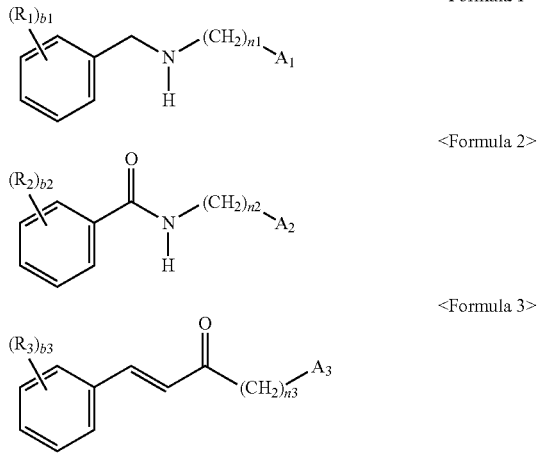

wherein, in Formulae 1 to 3, $A_1$ to $A_3$ may each independently be selected from hydrogen, deuterium, $—N(R_{11})(R_{12})$, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_1$-$C_{10}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, and a substituted or unsubstituted $C_1$-$C_{60}$ heteroaryl group, $R_1$ to $R_3$, $R_{11}$, and $R_{12}$ may each independently be selected from hydrogen, deuterium, —F, —Cl, —Br, —I, —OH, a cyano group, a nitro group, an amino group, an amidino group, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, and a substituted or unsubstituted $C_1$-$C_{10}$ alkoxy group, b1 to b3 may each independently be selected from an integer of 0 to 5, wherein at least two $R_1$s are the same as or different from each other when b1 is 2 or greater, at least two $R_2$s are the same as or different from each other when b2 is 2 or greater, and at least two $R_3$s are the same as or different from each other when b3 is 2 or greater, n1 to n3 may each independently be selected from an integer of 0 to 10, and at least one substituent of the substituted $C_1$-$C_{10}$ alkyl group, the substituted $C_2$-$C_{10}$ alkenyl group, the substituted $C_2$-$C_{10}$ alkynyl group, the substituted $C_1$-$C_{10}$ alkoxy group, the substituted $C_3$-$C_{10}$ cycloalkyl group, the substituted $C_1$-$C_{10}$ heterocycloalkyl group, the substituted $C_3$-$C_{10}$ cycloalkenyl group, the substituted $C_1$-$C_{10}$ heterocycloalkenyl group, the substituted $C_6$-$C_{60}$ aryl group, and the substituted $C_1$-$C_{60}$ heteroaryl group is selected from deuterium, —F, —Cl, —Br, —I, —OH, a cyano group, a nitro group, an amino group, an amidino group, and a $C_1$-$C_{10}$ alkyl group.

According to another aspect of the present disclosure, there is provided a method of destroying microalgae or mosses, the method including treating a moss cultivation facility, a marine microalgae cultivation facility, an area in which green or red tide is occurring, or an area in which green or red tide is expected to occur, with the above-described composition for destroying microalgae or mosses.

As used herein, the term "area" may refer to a region under the environment where green tide or red tide likely occurs, including any aquatic environments including both seawater and fresh water. The term "treating" or "treatment" may refer to contacting microalgae or mosses with the composition according to one or more embodiments, and may include adding the composition according to one or more embodiments to water including the microalgae or mosses such as to make the composition contact the composition. The adding of the composition may include spraying the composition onto the water surface, or a stirring step, which may optionally be performed while moving over the water surface.

In some embodiments, the method may use an out-of-water treatment method. The term "out-of-water treatment method" may refer to drawing water from a water system, treating the water with the composition for destroying microalgae or mosses to remove the microalgae or mosses, and then discharging treated water back into the water system. The term "water system" may refer to a water supply source, for example, natural water systems such as water reservoirs, lakes, rivers, and the like, and artificial water systems such as aquafarms, fishing spots, cultivation facilities, water zone in golf courses, water storage tanks, and the like. For example, the method may include: drawing raw water including microalgae or mosses from a water system; treating the raw water with the composition according to one or more embodiments; and discharging treated water back into the water system. To prevent red tide or green tide which may occur due to nutritive salts if they are released together with the treated water, the method according to one or more embodiments may further include removing the remaining composition, the remaining microalgae or mosses, organic material, nutritive salts, and dead microalgae or mosses. The removing step may include a physical method such as precipitation, solid-liquid separation, or simple filtration, or a chemical method using copper sulfate, a chlorine-based material, ultraviolet rays, ozone, or the like.

The method according to one or more embodiments may further include, before the treatment with the composition according to one or more embodiments, treating raw water with a flocculant to flocculate the algae. The resulting aggregate produced by the flocculant may be removed by floating it using air bubbles or by precipitation, and then the water (supernatant) from which the aggregate has been removed may be treated with the composition according to one or more embodiments, which may have advantages in terms of cost, since a lower amount of the composition may be used, and prevention of side effects which may likely occur from release of a high concentration of the composition. Examples of the flocculant may be aluminum sulfate, ferric sulfate, ferric chloride, polyaluminum chloride, polyaluminum silicate sulfate, polyhydroxy aluminum silicate chloride, or polyamines. An auxiliary flocculant, for example, sodium alginate, sodium silicate, bentonite, or kaolin, may be used. For example, an acidic or alkaline pH adjuster may be used.

In some other embodiments, the method according to one or more embodiments may use an in-water treatment method. The term "in-water treatment method" may refer to removing microalgae or mosses by spraying the composition according to one or more embodiments into a water system. Since the composition according to one or more embodiments is less toxic to other living organisms than to algae, the composition may be sprayed in an appropriate concentration range such as to treat the microalgae or mosses. The concentration of the composition may be appropriately adjusted according to a type of a water system to be treated, a pH, a salt concentration, a temperature, a composition, an area, a depth, a use, or aquatic organic distribution of the water system, types of microalgae or mosses to be treated, a concentration or distribution of the microalgae or mosses, a purpose of destruction of microalgae or mosses, a targeted achievement from the destruction, or the like. Like the "out-of-water treatment method," the "in-water treatment method" may further include removing the remaining composition, the remaining microalgae or mosses, organic material, nutritive salts, and dead microalgae or mosses. The removing step may include physical filtration using a filter such as filter paper, or may include floating the remaining materials as described above by spraying a flocculant at the same time as or sequentially so as to remove the remaining materials. The removing step may include generating air bubbles to supply oxygen to water, increase efficiency, and allow the flocculation to float without settling.

According to another aspect of the present disclosure, the composition according to one or more embodiments may be used to prevent green tide or red tide caused from microalgae or mosses. In this case, due to the presence of a small amount of microalgae or mosses, and a microalgae or mosses generation preventing effect of the composition according to one or more embodiments remaining after use, the amount of the composition may be further reduced. However, dead microalgae or mosses may function as nutritive salts contributing to the occurrence of green tide or red tide. Accordingly, together with) the in-water or out-of-water treatment method, a physical filtration, chemical treatment, or air bubble generation step may be further included.

Advantageous Effects of Invention

As described above, when a moss cultivation facility, a marine microalgae cultivation facility, an area in which green or red tide is occurring, or an area in which green or red tide is expected to occur is treated with the composition for destroying microalgae or mosses, according to the one or more embodiments, growth and proliferation of microalgae may be inhibited, and damage from red tide and/or green tide may be prevented.

DESCRIPTION OF EMBODIMENTS

Figure 1:
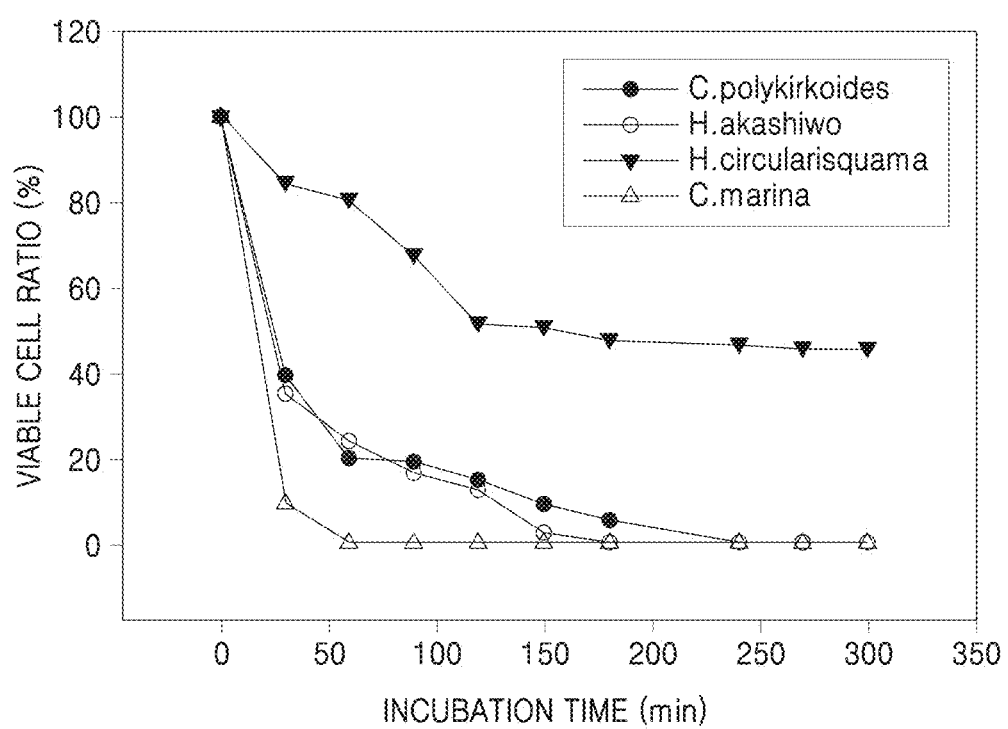
FIG. 1 shows viable cell ratios of four types of microalgae of *Chattonella Marina*, *Heterosigma circularisquama*, *Cochlodinium Polykrikoides*, and *Heterosigma* with respect to time, when culture solutions of the four microalgae were each treated with Compound 35 of Example 1 in Evaluation Example 2.

In accordance with an aspect of the disclosure, a composition for destroying microalgae or mosses includes a compound represented by one of Formulae 1 to 3 or a salt thereof as an active ingredient:

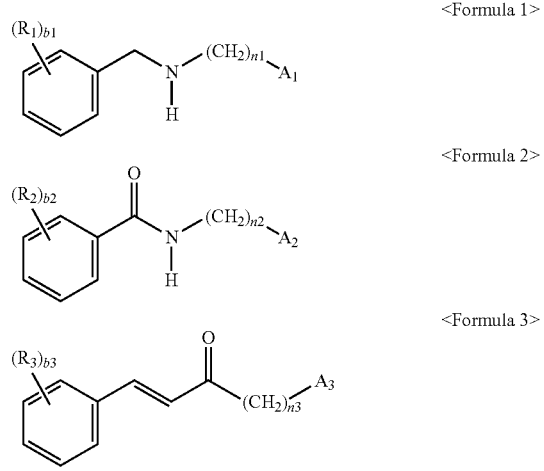

In Formulae 1 to 3, $A_1$ to $A_3$ may each independently be selected from hydrogen, deuterium, $-N(R_{11})(R_{12})$, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, a substituted or unsubstituted $C_1$-$C_{10}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, and a substituted or unsubstituted $C_1$-$C_{60}$ heteroaryl group, and $R_{11}$ and $R_{12}$ may each independently be selected from hydrogen, deuterium, $-F$, $-Cl$, $-Br$, $-I$, $-OH$, a cyano group, a nitro group, an amino group, an amidino group, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, and a substituted or unsubstituted $C_1$-$C_{10}$ alkoxy group.

For example, in Formulae 1 to 3, $A_1$ to $A_3$ may each independently be selected from $-N(R_{11})(R_{12})$, a substituted or unsubstituted $C_1$-$C_{10}$ alkyl group, a substituted or unsubstituted $C_1$-$C_{10}$ alkoxy group, a substituted or unsubstituted $C_3$-$C_{10}$ cycloalkyl group, a substituted or unsubstituted $C_6$-$C_{10}$ aryl group, and a substituted or unsubstituted $C_1$-$C_{10}$ heteroaryl group. However, embodiments are not limited thereto.

In some embodiments, in Formulae 1 to 3, $A_1$ to $A_3$ may each independently be selected from groups represented by Formulae 4-1 to 4-16. However, embodiments are not limited thereto:

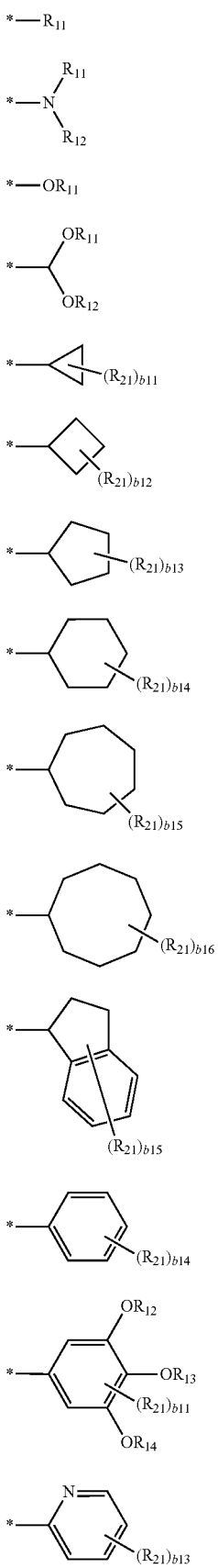

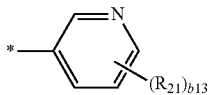
Formula 4-15

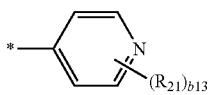
Formula 4-16

In Formulae 4-1 to 4-16, * is a binding site to a neighboring atom.

In Formulae 4-1 to 4-16, $R_{11}$ to $R_{14}$, and $R_{21}$ may each independently be selected from hydrogen, deuterium, —F, —Cl, —Br, —I, —OH, and a substituted or unsubstituted $C_1$-$C_{10}$ alkyl group.

For example, in Formulae 4-1 to 4-16, $R_{11}$ to $R_{14}$ may each independently be selected from a methyl group, an ethyl group, a propyl group, an isopropyl group, a butyl group, an isobutyl group, a sec-butyl group, and a tert-butyl group; and a methyl group, an ethyl group, a propyl group, an isopropyl group, a butyl group, an isobutyl group, a sec-butyl group, and a tert-butyl group, each substituted with —OH group, and $R_{21}$ may be selected from hydrogen, deuterium, —F, —Cl, —Br, —I, and —OH. However, embodiments are not limited thereto.

In Formulae 4-1 to 4-16,
b11 may be an integer of 0 to 2,
b12 may be an integer of 0 to 3,
b13 may be an integer of 0 to 4,
b14 may be an integer of 0 to 5,
b15 may be an integer of 0 to 6, and
b16 may be an integer of 0 to 7, wherein b11 indicates the number of $R_{21}$s. For example, when b11 is 2 or greater, at least two of $R_{21}$s may be the same or differ from each other. The meanings of b12 to b16 may also be understood based on the description of b11 and the structures of Formula 4-1 to 4-16.

For example, in Formulae 4-1 to 4-16, b11 to b16 may each independently be 0 or 1.

In some embodiments, in Formulae 1 to 3, $A_1$ to $A_3$ may each independently be selected from groups represented by Formulae 5-1 to 5-23. However, embodiments are not limited thereto:

Formula 5-1

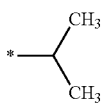
Formula 5-2

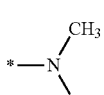
Formula 5-3

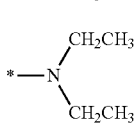
Formula 5-4

-continued

Formula 5-5 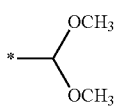

Formula 5-6 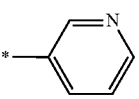

Formula 5-7 

Formula 5-8 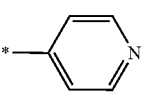

Formula 5-9 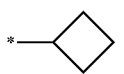

Formula 5-10 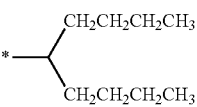

Formula 5-11 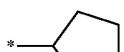

Formula 5-12 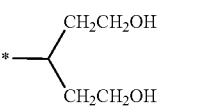

Formula 5-13 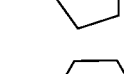

Formula 5-14 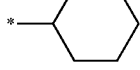

Formula 5-15 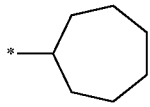

Formula 5-16 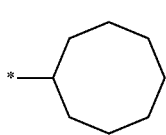

Formula 5-17 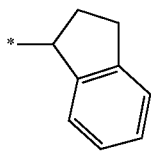

Formula 5-18 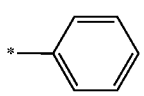

Formula 5-19 

Formula 5-20 

Formula 5-21 

Formula 5-22 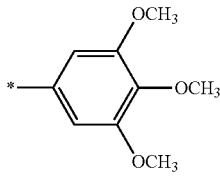

Formula 5-23 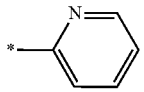

In Formulae 5-1 to 5-23, * is a binding site to a neighboring atom.

In Formulae 1 to 3, $R_1$ to $R_3$ may each independently be selected from hydrogen, deuterium, —F, —Cl, —Br, —I, —OH, a cyano group, a nitro group, an amino group, an amidino group, a substituted or unsubstituted $C_1$-$C_{10}$ alkyl group, a substituted or unsubstituted $C_2$-$C_{10}$ alkenyl group, a substituted or unsubstituted $C_2$-$C_{10}$ alkynyl group, and a substituted or unsubstituted $C_1$-$C_{10}$ alkoxy group.

For example, in Formulae 1 to 3, $R_1$ to $R_3$ may each independently be selected from hydrogen, deuterium, —F, —Cl, —Br, —I, —OH, a cyano group, a nitro group, an amino group, an amidino group, and a substituted or unsubstituted $C_1$-$C_{10}$ alkyl group. However, embodiments are not limited thereto.

For example, in Formulae 1 to 3, $R_1$ to $R_3$ may each independently be selected from hydrogen, deuterium, —F, —Cl, —Br, —I, and —OH.

In Formulae 1 to 3, b1 to b3 may each independently be an integer of 0 to 5. When b1 is 2 or greater, at least two of $R_1$s may be the same or differ from each other. When b2 is 2 or greater, at least two of $R_2$s may be the same of differ from each other. When b3 is 2 or greater, at least two of $R_3$s may be the same or differ from each other.

For example, in Formulae 1 to 3, b1 to b3 may each independently be 0, 1, or 2.

In some embodiments, in Formulae 1 to 3, $R_1$ to $R_3$ may be —Br or —OH when b1 to b3 are each 1; and $R_1$ to $R_3$ may be —Cl when b1 to b3 are each 2.

In some embodiments, in Formulae 1 to 3, two $R_1$s, two $R_2$s, and two $R_3$s may be in a para position when b1 to b3 are each 2.

In Formulae 1 to 3, n1 to n3 may each independently be an integer of 0 to 10.

For example, in Formulae 1 to 3, n1 to n3 may each independently be an integer of 0 to 3. However, embodiments are not limited thereto.

In some embodiments, the composition for destroying microalgae or mosses may include at least one of compounds represented by Formulae 1-1 to 1-6, 2-1 to 2-6, and 3-1 to 3-6 or a salt thereof as an active ingredient. However, embodiments are not limited thereto:

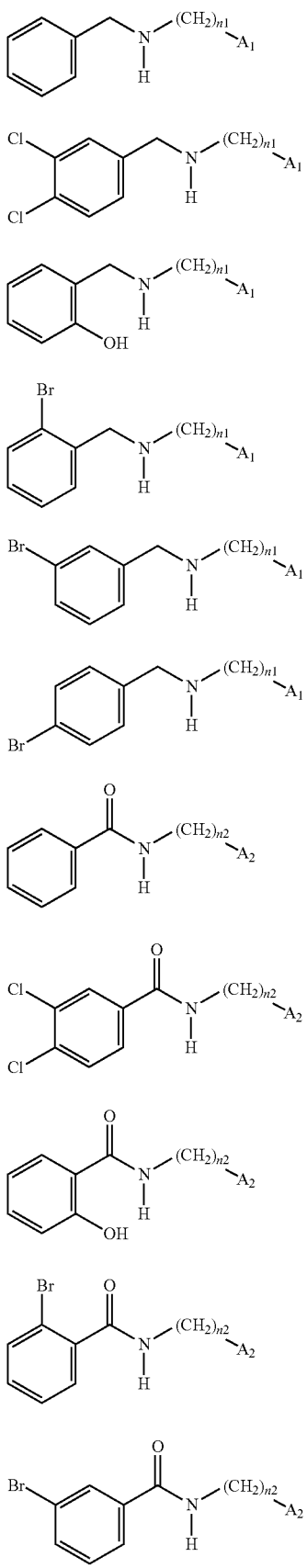
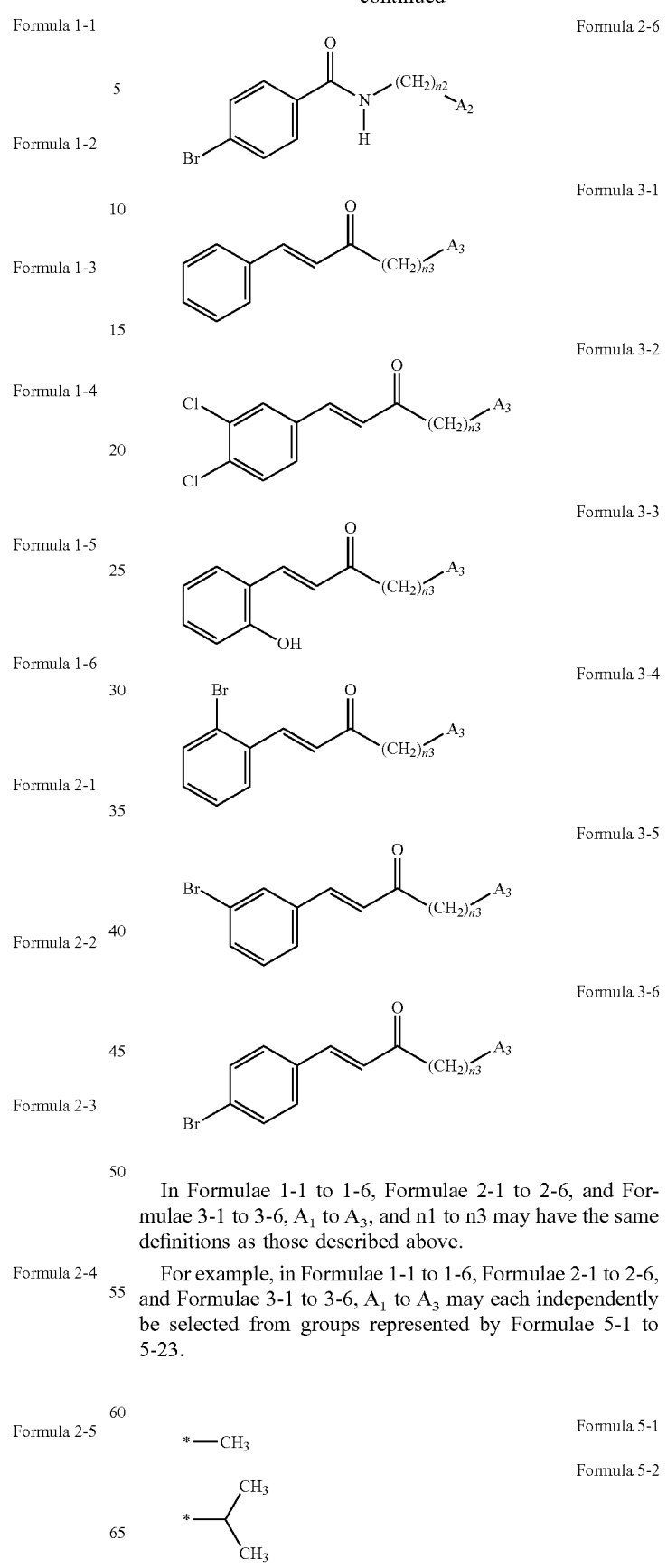
In Formulae 1-1 to 1-6, Formulae 2-1 to 2-6, and Formulae 3-1 to 3-6, $A_1$ to $A_3$, and n1 to n3 may have the same definitions as those described above.
For example, in Formulae 1-1 to 1-6, Formulae 2-1 to 2-6, and Formulae 3-1 to 3-6, $A_1$ to $A_3$ may each independently be selected from groups represented by Formulae 5-1 to 5-23.

-continued

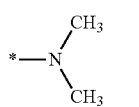

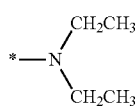

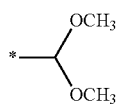

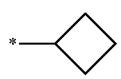

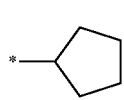

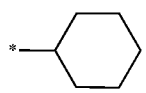

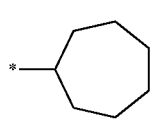

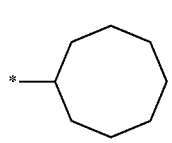

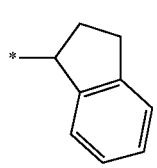

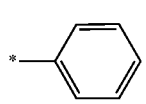

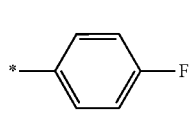

-continued

Formula 5-3

Formula 5-4

Formula 5-5

Formula 5-6

Formula 5-7

Formula 5-8

Formula 5-9

Formula 5-10

Formula 5-11

Formula 5-12

Formula 5-13

Formula 5-14

Formula 5-15

Formula 5-16

Formula 5-17

Formula 5-18
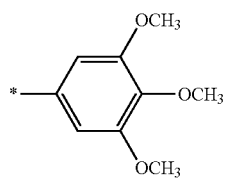

Formula 5-19
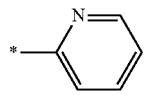

Formula 5-20
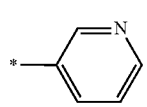

Formula 5-21
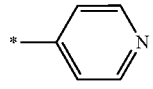

Formula 5-22
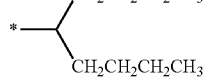

Formula 5-23
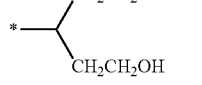

In Formulae 5-1 to 5-23, * is a binding site to a neighboring atom; and n1 to n3 may each independently be an integer of 0 to 3.

In some embodiments, the composition for deconstructing microalgae or mosses may include at least one of compounds 1 to 3, 5 to 10, 12, 13, 17 to 43, and 45 to 51 or a salt thereof as an active ingredient. However, embodiments are not limited thereto:

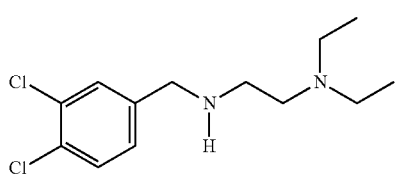

1

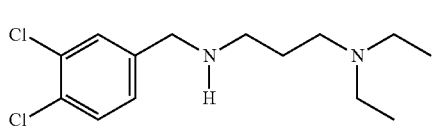

2

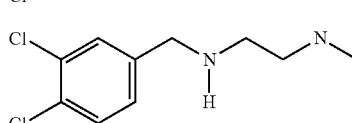

3

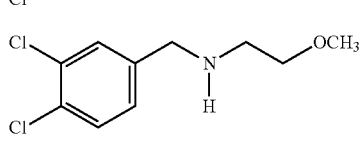

5

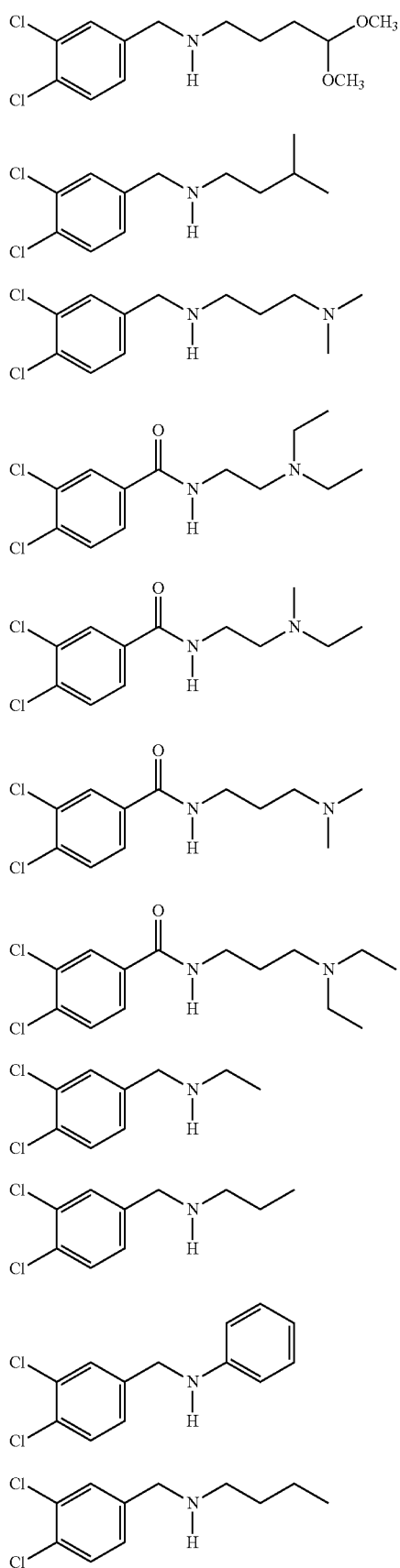
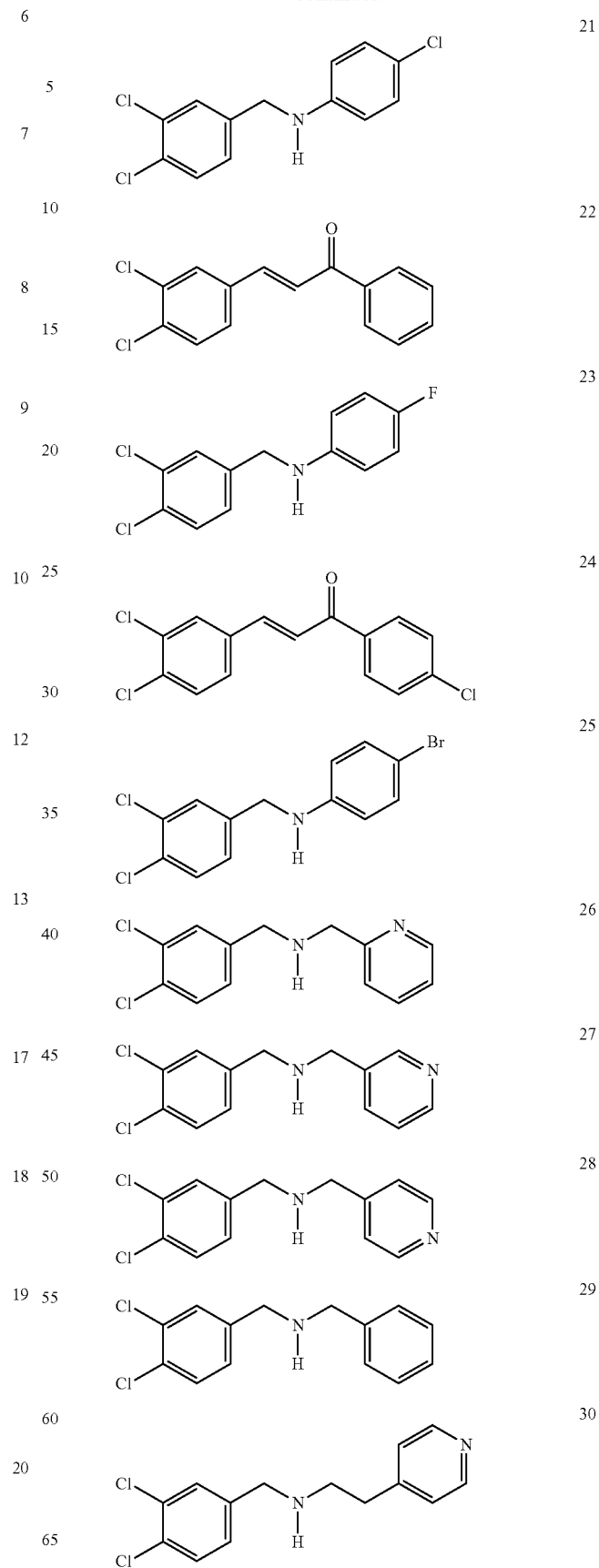

31 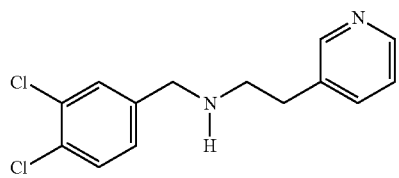
32 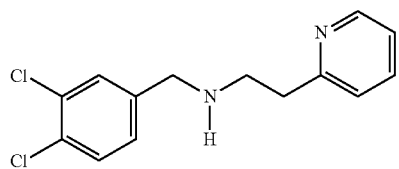
33 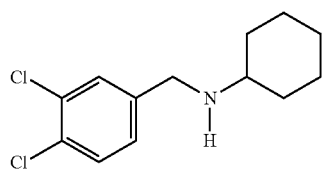
34 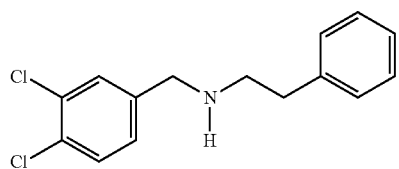
35 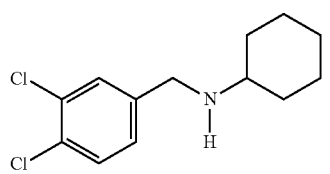
36 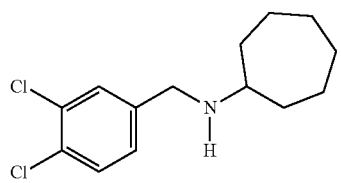
37 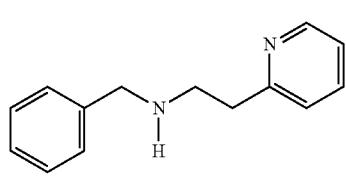
38 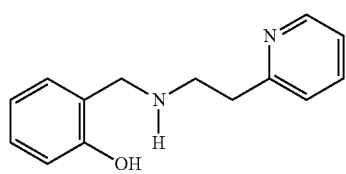
39 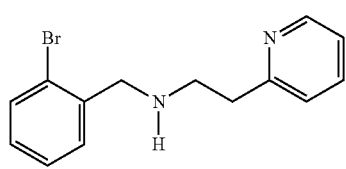
40 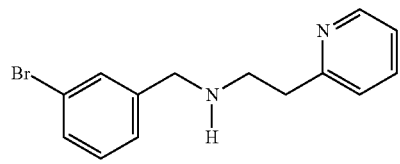
41 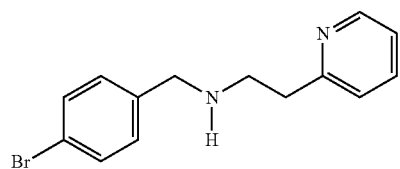
42 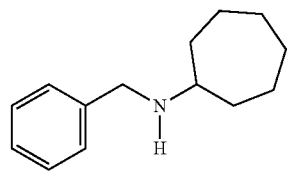
43 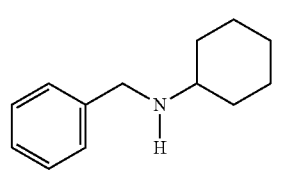
45 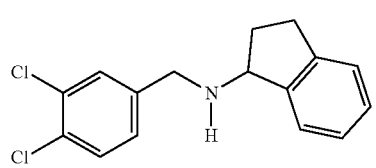
46 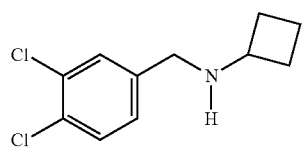
47 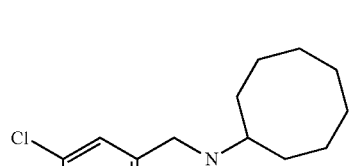
49 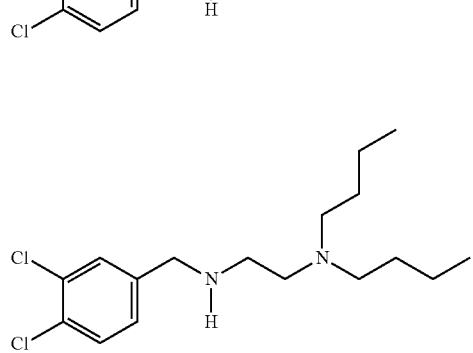

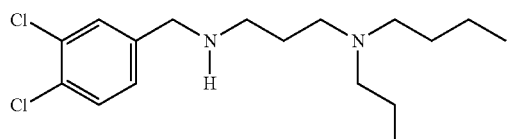

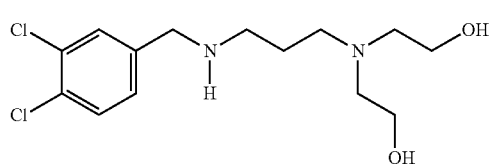

An effect of destroying microalgae or mosses, and in particular, harmful algae causing green tide or red tide, is influenced by the chemical structure of a specific substituent of a compound included in the composition for destroying microalgae or mosses. Accordingly, to increase the effect of destroying microalgae or mosses, a substituent having good algicidal activity is required. The composition for destroying microalgae or mosses may need to have good algicidal activity that is strong enough to destroy algae when a small amount of the composition is used, without causing secondary contamination.

The inventors of the present disclosure found that a compound represented by Formula 1 including a benzylamine group, a compound represented by Formula 2 including a benzamide group, and a compound represented by Formula 3 including a phenyl prophenone group have good algicidal activity.

As used herein, a $C_1$-$C_{10}$ alkyl group may refer to a monovalent linear or branched aliphatic hydrocarbon group having 1 to 10 carbon atoms. Non-limiting examples of the $C_1$-$C_{10}$ alkyl group are a methyl group, an ethyl group, a propyl group, an isobutyl group, a sec-butyl group, a tert-butyl group, a pentyl group, and a hexyl group.

As used herein, a $C_1$-$C_{10}$ alkoxy group may refer to a monovalent group represented by —$OA_{101}$ (wherein $A_{101}$ is a $C_1$-$C_{10}$ alkyl group as described above. Non-limiting examples of the $C_1$-$C_{10}$ alkoxy group are a methoxy group, an ethoxy group, and a propoxy group.

As used herein, a $C_2$-$C_{10}$ alkenyl group may refer to a hydrocarbon group including at least one carbon double bond in the middle or terminal of the $C_2$-$C_{10}$ alkyl group. Non-limiting examples of the $C_2$-$C_{10}$ alkenyl group are an ethenyl group, a prophenyl group, and a butenyl group.

As used herein, a $C_2$-$C_{10}$ alkynyl group may refer to a hydrocarbon group including at least one carbon triple bond in the middle or terminal of the $C_2$-$C_{10}$ alkyl group. Non-limiting examples of the $C_2$-$C_{10}$ alkynyl group are an ethynyl group and a propynyl group.

As used herein, a $C_3$-$C_{10}$ cycloalkyl group may refer to a monovalent, monocyclic saturated hydrocarbon group having 3 to 10 carbon atoms. Non-limiting examples of the $C_3$-$C_{10}$ cycloalkyl group are a cyclopropyl group, a cyclobutyl group, a cyclopentyl group, a cyclohexyl group, and a cycloheptyl group.

As used herein, a $C_1$-$C_{10}$ heterocycloalkyl group may refer to a monovalent monocyclic group having 1 to 10 carbon atoms in which at least one hetero atom selected from N, O, P, and S is included as a ring-forming atom. Non-limiting examples of the $C_1$-$C_{10}$ heterocycloalkyl group are a tetrahydrofuranyl group and a tetrahydrothiophenyl group.

As used herein, a $C_3$-$C_{10}$ cycloalkenyl group may refer to a monovalent monocyclic group having 3 to 10 carbon atoms and including at least one double bond in the ring, but not having aromaticity. Non-limiting examples of the $C_3$-$C_{10}$ cycloalkenyl group are a cyclopentenyl group, a cyclohexenyl group, and a cycloheptenyl group.

As used herein, a $C_1$-$C_{10}$ heterocycloalkenyl group may refer to a monovalent monocyclic group having 1 to 10 carbon atoms, including at least one hetero atom selected from N, O, P, and S as a ring-forming atom, and having at least one double bond in the ring. Non-limiting examples of the $C_1$-$C_{10}$ heterocycloalkenyl group are a 2,3-dihydrofuranyl group and a 2,3-dihydrothiophenyl group.

As used herein, a $C_6$-$C_{60}$ aryl group may refer to a monovalent, aromatic carbocyclic group having 6 to 60 carbon atoms. Non-limiting examples of the $C_6$-$C_{60}$ aryl group are a phenyl group, a naphthyl group, an anthracenyl group, a phenanthrenyl group, a pyrenyl group, and a chrysenyl group. When the $C_6$-$C_{60}$ aryl group includes at least two rings, the rings may be fused to each other.

As used herein, a $C_1$-$C_{60}$ heteroaryl group may refer to a monovalent, aromatic carbocyclic group having 1 to 60 carbon atoms and including at least one hetero atom selected from N, O, P, and S as a ring-forming atom. Non-limiting examples of the $C_1$-$C_{60}$ heteroaryl group are a pyridinyl group, a pyrimidinyl group, a pyrazinyl group, a pyridazinyl group, a triazinyl group, a quinolinyl group, and an isoquinolinyl group. When the $C_1$-$C_{60}$ heteroaryl includes at least two rings, the rings may be fused to each other.

At least one substituent of the substituted $C_1$-$C_{10}$ alkyl group, the substituted $C_2$-$C_{10}$ alkenyl group, the substituted $C_2$-$C_{10}$ alkynyl group, the substituted $C_1$-$C_{10}$ alkoxy group, the substituted $C_3$-$C_{10}$ cycloalkyl group, the substituted $C_1$-$C_{10}$ heterocycloalkyl group, the substituted $C_3$-$C_{10}$ cycloalkenyl group, the substituted $C_1$-$C_{10}$ heterocycloalkenyl group, the substituted $C_6$-$C_{60}$ aryl group, and the substituted $C_1$-$C_{60}$ heteroaryl group may be selected from deuterium, —F, —Cl, —Br, —I, —OH, a cyano group, a nitro group, an amino group, an amidino group, and a $C_1$-$C_{10}$ alkyl group.

As used herein, a salt of a compound according to the one or more embodiments may be prepared in the same reaction system during final separation, purification, and synthesis processes, or may be prepared separately by reaction with an inorganic base or an organic base. When a compound according to one or more embodiments includes an acidic group, the compound may form a salt with a base. For example, this salt may include, but is not limited to, an alkali metal salt such as a lithium salt, a sodium salt or a potassium salt; an alkali earth metal salt such as a barium salt or calcium salt; other metal salts such as a magnesium salt; an organic base salt such as a salt of dicyclohexylamine; and a salt of a basic amino acid such as lysine or arginine. When a compound according to one or more embodiments includes a basic group in molecular, the compound may form an acid addition salt. Examples of this acid addition salt may include, but are not limited to, an inorganic acid, and in particular, a salt of a hydrohalogenic acid (e.g., hydrofluoric acid, hydrobromic acid, hydroiodic acid or hydrochloric acid), nitric acid, carbonic acid, sulfuric acid, or phosphoric acid; a salt of a low alkyl sulfonic acid such as methanesulfonic acid, trifluoromethanesulfonic acid, or ethanesulfonic acid; a salt of benzenesulfonic acid or p-toluene sulfonic acid; a salt of an organic carboxylic acid such as acetic acid, tumaric acid, tartaric acid, oxalic acid, maleic acid, malic acid, succinic acid, or citric acid; and a salt of an amino acid such as glutamic acid or aspartic acid.

The compound according to one or more embodiments may include a derivative in the form of a hydrate or a solvate of the compound (J. M. Keith, 2004, *Trahedron Letters*, 45(13), 2739-2742).

The compound according to the one or more embodiments may be isolated from nature or may be prepared using a chemical synthesis method known in the art, for example, usually by reacting a substituent compound with an appropriate reaction solvent to obtain an intermediate product and then reacting the intermediate product in a suitable reaction solvent.

The reaction solvent which may be used in the preparation process is not specifically limited as long as it is not involved in a reaction. Examples of the reaction solvent may include ethers such as diethyl ether, tetrahydrofuran and dioxane; halogenated hydrocarbons such as dichloromethane and chloroform; amines such as pyridine, piperidine, and triethylamine; acetone; alkyl ketones such as methyl ethyl ketone and methyl isobutyl; alcohols such as methanol, ethanol and propanol; aprotic polar solvents such as N, N-dimethylformamide, N, N-dimethylacetamide, acetonitrile, dimethylsulfoxide, and hexamethylphosphoric triamide. In particular, among non-reactive organic solvents generally used in organic synthesis, a solvent capable of isolating water during reaction with a Dean-Stark trap may be used. Examples of such a solvent include benzene, toluene, xylene, and the like. However, embodiments are not limited thereto. Separation and purification of a reaction product may be carried out through a process that is usually performed such as concentration, extraction, and the like. For example, separation and purification may be performed through a purification process by column chromatography on silica gel if needed.

The present disclosure may also include any modification of methods of preparing compounds according to the one or more embodiments, wherein an intermediate product obtained in any step may be used as a starting material for the remaining steps, wherein the starting material may be formed in a reaction system under reaction conditions, and the reaction components may be used in the form of a salt or an optical enantiomer.

According to types of substituents, intermediate products, and a preparation method selected to prepare the compound according to one or more embodiments, any possible isomer forms, for example, substantially pure geometric (cis or trans) isomers, optical isomers (enantiomers), or racemates may also be within the scope of the present invention.

In accordance with another aspect of the present disclosure, there is provided a method of destroying microalgae or mosses by using the composition for destroying microalgae or mosses, according to the one or more embodiments. The method of destroying microalgae or mosses may include treating a moss cultivation facility, a marine microalgae cultivation facility, an area in which green or red tide is occurring, or an area in which green or red tide is expected to occur, with the composition for destroying microalgae or mosses, according to the one or more embodiments.

The microalgae or mosses may be algae or mosses which may cause green tide or red tide or which may have a biodiesel-producing ability. For example, the algae may be selected from blue-green algae, diatoms, green algae, euglenoid algae, flagellates, yellow-green algae, Dinophyta, Raphidophytes, and algae with a biodiesel-producing ability. However, embodiments are not limited thereto.

Mosses refer to plants belonging to Bryophyta or mosses that mostly grow in wet or shady areas. As used herein, the mosses may be selected from the class Takakiopsida, the class Sphagnopsida, the class Andreaeopsida, the class Andreaeobryopsida, the class Oedipodiopsida, the class Polytrichopsida, the class Tetraphidopsida, and the class Bryopsida. However, embodiments are not limited thereto.

The blue-green algae may be selected from the genus *Microcystis*, the genus *Anabaena*, the genus *Aphanizomenon*, and the genus *Oscillatoria*. However, embodiments are not limited thereto.

The diatoms may be selected from the genus *Synedra*, the genus *Asterionella*, the genus *Cyclotella*, the genus *Melosira*, the genus *Skeletonema costatum*, the genus *Chaetoceros*, the genus *Thalassiosira*, the genus *Leptocylindrus*, the genus *Nitzschia*, the genus *Cylindrotheca*, the genus *Eucampia*, and the genus *Odontella*. However, embodiments are not limited thereto.

The green algae may be selected from the genus *Closterium*, the genus *Pediastrum*, and the genus *Scenedesmus*. However, embodiments are not limited thereto.

The euglenoid algae may be of the genus *Trachelomonas* or the genus *Euglena*. However, embodiments are not limited thereto.

The flagellates may be selected from algae of the genus *Peridinium*, the genus *Heterosigma*, the genus *Heterocapsa*, the genus *Cochlodinium*, the genus *Prorocentrum*, the genus *Ceratium*, the genus *Noctiluca*, the genus *Scrippsiella*, the genus *dinophysis*, the genus *Alexandrium*, the genus *Eutreptiella*, the genus *Pfiesteria*, the genus *Chattonella*, the genus *Emiliania*, and the genus *Gymnodinium*. However, embodiments are not limited thereto.

The yellow-green algae may be of the genus *Uroglena*. However, embodiments are not limited thereto.

The Dinophyta and the raphidophytes may be selected from the genus *Heterosigma*, the genus *Heterocapsa*, the genus *Cochlodinium*, the genus *Prorocentrum*, the genus *Ceratium*, the genus *Noctiluca*, the genus *Scrippsiella*, the genus *dinophysis*, the genus *Alexandrium*, the genus *Eutreptiella*, the genus *Pfiesteria*, the genus *Chattonella*, the genus *Emiliania*, and the genus *Gymnodinium*. However, embodiments are not limited thereto.

The algae with a biodiesel-producing ability may be selected from the genus *Pseudochoricystis*, the genus *Botryococcus*, and the genus *Dunaliella*. However, embodiments are not limited thereto.

When the composition for destroying microalgae or mosses, according to the one or more embodiments, including the compounds represented by Formulae 1 to 51 or a salt thereof, is used to treat a moss cultivation facility, a marine microalgae cultivation facility, an area in which green or red tide is occurring, or an area in which green or red tide is expected to occur, the use amount of the composition may be appropriately selected such that a final concentration of the composition remaining in the treated area reaches 1 μM to 100 μM, for example, about 1 μM to 30 μM.

One or more embodiments of the composition for destroying microalgae or mosses will now be described in detail with reference to the following examples. However, these examples are only for illustrative purposes and are not intended to limit the scope of the one or more embodiments of the present disclosure.

EXAMPLES: PREPARATION OF COMPOUNDS

All compounds used for synthesis were purchased from Sigma-Aldrich, TCI, Junsei, and Merck. Moisture-sensitive compounds were reacted under a $N_2$ atmosphere.

Each compound was analyzed by $^1$H Nuclear magnetic resonance (NMR, YH300, Oxford Instruments) using tetramethylsilane (TMA) in $CDCl_3$ or DMSO as a standard

Example 1

Synthesis of Compound 1 (N'-(3,4-dichloro-benzyl)-N,N-diethyl-ethane-1,2-diamine)

After 1 g (5.714 mmol) of 3,4-dichlorobenzaldehyde was dissolved in 10 mL of methanol, 0.664 g (5.714 mmol) of N,N-diethylethylenediamine was added thereto and reacted at room temperature for 1 hour. 0.32 g (8.45 mmol) of sodium borohydride was slowly added thereto and stirred for 1 hour. The degree of progress of reaction was confirmed by thin layer chromatography (TLC). When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of N'-(3,4-dichloro-benzyl)-N,N-diethyl-ethane-1,2-diamine.

Yield: 89.5%

$^1$H NMR (300 MHz, CDCl$_3$) δ 7.44 (d, J=1.8 Hz, 1H), δ 7.39 (d, J=8.0 Hz, 1H), δ 7.18 (dd, J=8.0 and 1.8 Hz, 1H), δ 3.76 (s, 1H), δ 2.68 (m, 8H), δ 1.06 (t, J=6.9 Hz, 6H)

Example 2

Synthesis of Compound 2 (N'-(3,4-Dichloro-benzyl)-N,N-diethyl-propane-1,3-diamine)

After 1 g (5.714 mmol) of 3,4-dichlorobenzaldehyde was dissolved in 10 mL of methanol, 0.744 g (5.714 mmol) of N,N-diethyl-1,3-diaminopropane was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of N'-(3,4-dichloro-benzyl)-N,N-diethyl-propane-1,3-diamine.

Yield: 90.75%

$^1$H NMR (300 MHz, CDCl$_3$) δ 7.43 (d, J=1.8 Hz, 1H), δ 7.39 (d, J=8.0 Hz, 1H), δ 7.17 (dd, J=8.0 and 1.8 Hz, 1H), δ 3.73 (s, 2H), δ 2.66 (t, J=6.5 Hz, 2H), δ 2.57 (m, 6H), δ 1.72 (m, J=6.5 Hz, 1H), δ 1.05 (t, J=7.3 Hz, 6H)

Example 3

Synthesis of Compound 3 (N'-(3,4-Dichloro-benzyl)-N,N-dimethyl-ethane-1,2-diamine)

After 1 g (5.714 mmol) of 3,4-dichlorobenzaldehyde was dissolved in 10 mL of methanol, 0.503 g (5.714 mmol) of N,N-dimethylethylenediamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of N'-(3,4-Dichloro-benzyl)-N,N-dimethyl-ethane-1,2-diamine.

Yield: 93.2%

$^1$H NMR (300 MHz, CDCl$_3$) δ 7.44 (d, J=2.2 Hz, 1H), δ 7.39 (d, J=8.4 Hz, 1H), δ 7.18 (dd, J=8.4 and 2.2 Hz, 1H), δ 3.76 (s, 2H), δ 2.68 (m, J=5.8 Hz, 2H), δ 2.45 (t, J=5.8 Hz, 2H), δ 2.21 (s, 6H), δ 2.12 (s, 1H)

Example 5

Synthesis of Compound 5 ((3,4-dichloro-benzyl)-(2-methoxy-ethyl)-amine)

After 1 g (5.714 mmol) of 3,4-dichlorobenzaldehyde was dissolved in 10 mL of methanol, 0.429 g (5.714 mmol) of 2-methoxyethylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of 3,4-dichloro-benzyl)-(2-methoxy-ethyl)-amine.

Yield: 92.1%

$^1$H NMR (300 MHz, CDCl$_3$) δ 7.45 (d, J=1.8 Hz, 1H), δ 7.39 (d, J=8.0 Hz, 1H), δ 7.18 (dd, J=8.0 and 1.8 Hz, 1H), δ 3.76 (s, 2H), δ 3.52 (t, J=5.1 Hz, 2H), δ 3.35 (s, 3H), δ 2.79 (t, J=5.3 Hz, 2H)

Example 6

Synthesis of Compound 6 ((3,4-Dichloro-benzyl)-(4,4-dimethoxy-butyl)-amine)

After 1 g (5.714 mmol) of 3,4-dichlorobenzaldehyde was dissolved in 10 mL of methanol, 0.761 g (5.714 mmol) of 4-aminobutyraldehyde dimethyl acetal was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of (3,4-dichloro-benzyl)-(4,4-dimethoxy-butyl)-amine.

Yield: 87.15%

$^1$H NMR (300 MHz, CDCl$_3$) δ 7.43 (d, J=1.8 Hz, 1H), δ 7.39 (d, J=8.0 Hz, 1H), δ 7.17 (dd, J=8.0 and 1.8 Hz, 1H), δ 4.38 (t, J=5.49 Hz, 1H), δ 3.74 (s, 2H), δ 3.31 (s, 6H), δ 2.64 (t, 2H), δ 1.69 (m, 4H)

Example 7

Synthesis of Compound 7 ((3,4-Dichloro-benzyl)-(3-methyl-butyl)-amine))

After 1 g (5.714 mmol) of 3,4-dichlorobenzaldehyde was dissolved in 10 mL of methanol, 0.498 g (5.714 mmol) of isoamylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of (3,4-dichloro-benzyl)-(3-methyl-butyl)-amine.

Yield: 94%

$^1$H NMR (300 MHz, CDCl$_3$) δ 7.43 (d, J=2.19 Hz, 1H), δ 7.38 (d, J=8.0 Hz, 1H), δ 7.17 (dd, J=8.0 and 2.19 Hz, 1H), δ 3.74 (s, 2H), δ 2.63 (t, 2H), δ 1.70 (m, J=6.9 Hz, 1H), δ 1.42 (m, J=6.9 Hz, 2H), δ 1.28 (b, 1H), δ 0.90 (d, 6H)

Example 8

Synthesis of Compound 8 (N'-(3,4-Dichloro-benzyl)-N,N-dimethyl-propane-1,3-diamine)

After 1 g (5.714 mmol) of 3,4-dichlorobenzaldehyde was dissolved in 10 mL of methanol, 0.583 g (5.714 mmol) of N,N-dimethyl-1,3-propanediamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of N'-(3,4-dichloro-benzyl)-N,N-dimethyl-propane-1,3-diamine.

Yield: 89.9%

$^1$H NMR (300 MHz, CDCl$_3$) δ 7.43 (d, J=1.8 Hz, 1H), δ 7.39 (d, J=8.4 Hz, 1H), δ 7.17 (dd, J=8.4 and 1.8 Hz, 1H), δ 3.74 (s, 2H), δ 2.66 (t, J=6.9 Hz, 2H), δ 2.34 (t, J=6.9 Hz, 2H), δ 2.22 (s, 6H), δ 1.72 (m, J=6.9 Hz, 3H)

Example 9

Synthesis of Compound 9 (3,4-Dichloro-N-(2-diethylamino-ethyl)-benzamide)

After 1 g (4.774 mmol) of 3,4-dichlorobenzoyl chloride was dissolved in 20 mL of tetrahydrofuran (THF), 0.621 g (4.774 mmol) of N,N-diethylethylenediamine was added thereto, and 1 mL (7.161 mmol) of triethylamine was slowly added and stirred for 1 hour. The degree of progress of reaction was confirmed by TLC. When the reaction did not proceed further, 40 mL of water was added to the mixture, and the mixture was extracted three times with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of 3,4-dichloro-N-(2-diethylamino-ethyl)-benzamide.

Yield: 94.1%

$^1$H NMR (300 MHz, CDCl$_3$) δ 7.90 (d, J=2.1 Hz, 1H), δ 7.62 (dd, J=8.0 and 2.1 Hz, 1H), δ 7.51 (d, J=8.0 Hz, 1H), δ 7.1 (b, 1H), δ 3.51 (m, J=5.1 Hz, 2H), δ 2.69 (t, J=5.1 Hz, 2H), δ 2.63 (m, J=6.9 Hz, 4H), δ 1.08 (t, J=6.9 Hz, 6H)

Example 10

Synthesis of Compound 10 (3,4-Dichloro-N-(2-dimethylamino-ethyl)-benzamide)

After 1 g (4.774 mmol) of 3,4-dichlorobenzoyl chloride was dissolved in 20 mL of THF, 0.420 g (4.774 mmol) of N,N-diethylethylenediamine was added thereto, and 1 mL (7.161 mmol) of triethylamine was slowly added and stirred for 1 hour. The degree of progress of reaction was confirmed by TLC. When the reaction did not proceed further, 40 mL of water was added to the mixture, and the mixture was extracted three times 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow solid of 3,4-Dichloro-N-(2-dimethylamino-ethyl)-benzamide.

Yield: 95%

$^1$H NMR (300 MHz, CDCl$_3$) δ 7.91 (d, J=2.2 Hz, 1H), δ 7.65 (dd, J=8.0 and 2.2 Hz, 1H), δ 7.52 (d, J=8.0 Hz, 1H), δ 6.96 (b, 1H), δ 3.55 (m, J=5.8 Hz, 2H), δ 2.58 (t, J=5.8 Hz, 2H), δ 2.30 (s, 6H)

Example 12

Synthesis of Compound 12 (3,4-Dichloro-N-(3-dimethylamino-propyl)-benzamide)

After 1 g (4.774 mmol) of 3,4-dichlorobenzoyl chloride was dissolved in 20 mL of THF, 0.487 g (4.774 mmol) of dimethyl-1,3-propanediamine was added thereto, and 1 mL (7.161 mmol) of triethylamine was slowly added and stirred for 1 hour. The degree of progress of reaction was confirmed by TLC. When the reaction did not proceed further, 40 mL of water was added to the mixture, and the mixture was extracted three times with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a red solid of 3,4-dichloro-N-(3-dimethylamino-propyl)-benzamide.

Yield: 97.6%

$^1$H NMR (300 MHz, CDCl$_3$) δ 9.02 (b, 1H), δ 7.88 (d, J=1.8 Hz, 1H), δ 7.65 (dd, J=8.4 and 1.8 Hz, 1H), δ 7.51 (d, J=8.4 Hz, 1H), δ 3.59 (m, J=5.8 Hz, 2H), δ 2.61 (t, J=5.8 Hz, 2H), δ 2.37 (s, 6H), δ 1.84 (m, J=5.8 Hz, 2H)

Example 13

Synthesis of Compound 13
(3,4-Dichloro-N-(3-diethylamino-propyl)-benzamide)

After 1 g (4.774 mmol) of 3,4-dichlorobenzoyl chloride was dissolved in 20 mL of THF, 0.621 g (4.774 mmol) of N,N-diethyl-1,3-diaminopropane was added thereto, and 1 mL (7.161 mmol) of triethylamine was slowly added and stirred for 1 hour. The degree of progress of reaction was confirmed by TLC. When the reaction did not proceed further, 40 mL of water was added to the mixture, and the mixture was extracted three times with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-yellow solid of 3,4-dichloro-N-(3-diethyl-amino-propyl)-benzamide.

Yield: 91.2%

$^1$H NMR (300 MHz, CDCl$_3$) δ 9.31 (b, 1H), δ 7.89 (d, J=2.1 Hz, 1H), δ 7.68 (dd, J=8.4 and 2.1 Hz, 1H), δ 7.51 (d, J=8.4 Hz, 1H), δ 3.59 (m, J=5.4 Hz, 2H), δ 2.68 (m, 6H), δ 1.81 (m, J=5.4 Hz, 2H), δ 1.09 (t, J=6.9 Hz, 6H)

Example 17

Synthesis of Compound 17
((3,4-Dichloro-benzyl)-ethyl-amine)

After 1 g (5.714 mmol) of 3,4-dichlorobenzaldehyde was dissolved in 10 mL of methanol, 0.257 g (5.714 mmol) of ethylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of (3,4-Dichloro-benzyl)-ethyl-amine.

Yield: 95.4%

$^1$H NMR (300 MHz, CDCl$_3$) δ 7.43 (d, J=2.1 Hz, 1H), δ 7.38 (d, J=8.4 Hz, 1H), δ 7.17 (dd, J=8.4 and 2.1 Hz, 1H), δ 3.74 (s, 2H), δ 2.69 (m, J=6.9, 2H), δ 1.28 (b, 1H), δ 1.15 (t, J=6.9 Hz, 3H)

Example 18

Synthesis of Compound 18
((3,4-Dichloro-benzyl)-propyl-amine)

After 1 g (5.714 mmol) of 3,4-dichlorobenzaldehyde was dissolved in 10 mL of methanol, 0.337 g (5.714 mmol) of propylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of (3,4-Dichloro-benzyl)-propyl-amine.

Yield: 94.3%

$^1$H NMR (300 MHz, CDCl$_3$) δ 7.45 (d, J=1.8 Hz, 1H), δ 7.39 (d, J=8.4 Hz, 1H), δ 7.17 (dd, J=8.4 and 1.8 Hz, 1H), δ 3.73 (s, 2H), δ 2.58 (t, J=7.3 Hz, 2H), δ 1.58 (m, J=7.3 Hz, 2H), δ 1.42 (b, 1H), δ 0.94 (t, J=7.3 Hz, 3H)

Example 19

Synthesis of Compound 19
((3,4-Dichloro-benzyl)-phenyl-amine)

After 1 g (5.714 mmol) of 3,4-dichlorobenzaldehyde was dissolved in 10 mL of methanol, 0.532 g (5.714 mmol) of aniline was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of (3,4-Dichloro-benzyl)-phenyl-amine.

Yield: 87%

$^1$H NMR (300 MHz, CDCl$_3$) δ 7.45 (d, J=1.8 Hz, 1H), δ 7.39 (d, J=8.0 Hz, 1H), δ 7.2 (m, 3H), δ 6.76 (tt, J=7.3 and 1.0 Hz, 1H), δ 6.59 (dt, J=7.3 and 1.0 Hz, 2H), δ 4.29 (s, 2H), δ 4.10 (b, 1H)

Example 20

Synthesis of Compound 20
(Butyl-(3,4-dichloro-benzyl)-amine)

After 1 g (5.714 mmol) of 3,4-dichlorobenzaldehyde was dissolved in 10 mL of methanol, 0.417 g (5.714 mmol) of buthylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of butyl-(3,4-dichloro-benzyl)-amine.

Yield: 93.4%

$^1$H NMR (300 MHz, CDCl$_3$) δ 7.43 (d, J=2.1 Hz, 1H), δ 7.39 (d, J=8.0 Hz, 1H), δ 7.17 (dd, J=8.0 and 2.1 Hz, 1H), δ 3.74 (s, 2H), δ 2.62 (t, J=6.9 and 7.3 Hz, 2H), δ 1.53 (m, J=6.9 Hz, 4H), δ 1.25 (b, 1H), δ 0.93 (t, J=7.32 Hz, 3H)

Example 21

Synthesis of Compound 21 ((4-Chloro-phenyl)-(3,4-dichloro-benzyl)-amine)

After 1 g (5.714 mmol) of 3,4-dichlorobenzaldehyde was dissolved in 10 mL of methanol, 0.728 g (5.714 mmol) of 4-chloroaniline was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of (4-Chloro-phenyl)-(3,4-dichloro-benzyl)-amine.

Yield: 89%

$^1$H NMR (300 MHz, CDCl$_3$) δ 7.44 (d, J=1.8 Hz, 1H), δ 7.41 (d, J=8.0 Hz, 1H), δ 7.19 (dd, J=8.0 and 1.8 Hz, 1H), δ 7.13 (dt, J=9.8 and 2.2 Hz, 2H), δ 6.52 (dt, J=9.8 and 2.2 Hz, 2H), δ 4.28 (s, 2H), δ 4.14 (b, 1H)

Example 22

Synthesis of Compound 22 (3-(3,4-Dichloro-phenyl)-1-phenyl-propenone)

After 1 g (5.714 mmol) of 3,4-dichlorobenzaldehyde was dissolved in 20 mL of ethanol, 0.686 g (5.714 mmol) of acetophenone was added thereto and completely dissolved. While the resulting mixture was stirred at about 0° C. or lower, 1.2 mL of 4M NaOH was slowly dropwise added thereto and stirred at room temperature for about 3 hours. The degree of progress of reaction was confirmed by TLC. When the starting materials were not detected any longer, the resulting reaction product was washed with cold ethanol and then filtered. The resulting reaction product was separated using a silica gel-filled column with a mixed solvent of ethyl acetate and n-hexane as a mobile phase, to thereby obtain a white solid of 3-(3,4-Dichloro-phenyl)-1-phenyl-propenone.

Yield: 73.2%

$^1$H NMR (300 MHz, CDCl$_3$) δ 8.04 (dt, 2H), δ 7.74 (d, J=1.83 Hz, 1H), δ 7.68 (s, 1H), δ 7.64 (tt, 1H), δ 7.55 (m, 5H)

Example 23

Synthesis of Compound 23 ((3,4-Dichloro-benzyl)-(4-fluoro-phenyl)-amine)

After 1 g (5.714 mmol) of 3,4-dichlorobenzaldehyde was dissolved in 10 mL of methanol, 0.640 g (5.714 mmol) of 4-fluoroaniline was added thereto and reacted at room temperature for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of (3,4-dichloro-benzyl)-(4-fluoro-phenyl)-amine.

Yield: 86%

$^1$H NMR (300 MHz, CDCl$_3$) δ 7.46 (d, J=1.8 Hz, 1H), δ 7.41 (d, J=8.0 Hz, 1H), δ 7.21 (dd, J=8.0 and 1.8 Hz 1H), δ 6.91 (m, 2H), δ 6.53 (m, 2H), δ 4.26 (s, 2H), δ 4.01 (b, 1H)

Example 24

Synthesis of Compound 24 (1-(4-Chloro-phenyl)-3-(3,4-dichloro-phenyl)-propenone)

After 1 g (5.714 mmol) of 3,4-dichlorobenzaldehyde was dissolved in 20 mL of ethanol, 4-0.883 g (5.714 mmol) of chloroacetophenone was added thereto and completely dissolved. While the resulting mixture was stirred at about 0° C. or lower, 1.2 mL of 4M NaOH was slowly dropwise added thereto and stirred at room temperature for about 3 hours. The degree of progress of reaction was confirmed by TLC. When the starting materials were not detected any longer, the resulting reaction product was washed with cold ethanol and then filtered. The resulting reaction product was separated using a silica gel-filled column with a mixed solvent of ethyl acetate and n-hexane as a mobile phase, to thereby obtain a white solid of 3-(3,4-Dichloro-phenyl)-1-phenyl-propenone.

Yield: 75.8%

$^1$H NMR (300 MHz, CDCl$_3$) δ 7.99 (dt, 2H), δ 7.74 (d, J=1.83 Hz, 1H), δ 7.68 (s, 1H), δ 7.52 (m, 5H)

Example 25

Synthesis of Compound 25 ((4-Bromo-phenyl)-(3,4-dichloro-benzyl)-amine)

After 1 g (5.714 mmol) of 3,4-dichlorobenzaldehyde was dissolved in 10 mL of methanol, 0.982 g (5.714 mmol) of 4-bromoaniline was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of (4-Bromo-phenyl)-(3,4-dichloro-benzyl)-amine.

Yield: 30.5%

$^1$H NMR (300 MHz, CDCl$_3$) δ 7.44 (d, J=1.8 Hz, 1H), δ 7.41 (d, J=8.0 Hz, 1H), δ 7.26 (tt, 2H), δ 7.19 (dd, J=8.0 and 1.8 Hz, 1H), δ 6.48 (tt, 2H), δ 4.29 (d, 2H), δ 4.16 (b, 1H)

Example 26

Synthesis of Compound 26 ((3,4-Dichloro-benzyl)-pyridin-2-ylmethyl-amine)

After 1 g (5.714 mmol) of 3,4-dichlorobenzaldehyde was dissolved in 10 mL of methanol, 0.617 g (5.714 mmol) of 2-picolylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a red liquid of (3,4-dichloro-benzyl)-pyridin-2-ylmethyl-amine.

Yield: 73.3%

$^1$H NMR (300 MHz, CDCl$_3$) δ 8.57 (d, 1H), δ 7.68 (td, J=7.6 and 1.8 Hz, 1H), δ 7.48 (d, J=1.8 Hz, 1H), δ 7.40 (d, J=8.0 Hz, 1H), δ 7.30 (d, J=8.0 Hz, 1H), δ 7.21 (m, 2H), δ 3.90 (s, 2H), δ 3.79 (s, 2H), δ 2.16 (b, 1H)

Example 27

Synthesis of Compound 27
((3,4-Dichloro-benzyl)-pyridin-3-ylmethyl-amine)

After 1 g (5.714 mmol) of 3,4-dichlorobenzaldehyde was dissolved in 10 mL of methanol, 0.617 g (5.714 mmol) of 3-icolylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate, n-hexane, and methanol as a mobile phase, to thereby obtain a yellow liquid of (3,4-Dichloro-benzyl)-pyridin-3-ylmethyl-amine.

Yield: 69.8%

$^1$H NMR (300 MHz, CDCl$_3$) δ 8.57 (d, J=1.8 Hz, 1H), δ 8.53 (dd, J=4.7 and 1.8 Hz, 1H), δ 7.72 (d, J=7.7 Hz, 1H), δ 7.47 (d, J=1.8 Hz, 1H), δ 7.41 (d, J=8.43 Hz, 1H), δ 7.30 (m, 1H), δ 7.20 (dd, J=8.4 and 1.8 Hz, 1H), δ 3.80 (s, 2H), δ 3.77 (s, 2H), δ 2.04 (b, 1H)

Example 28

Synthesis of Compound 28
((3,4-Dichloro-benzyl)-pyridin-4-ylmethyl-amine)

After 1 g (5.714 mmol) of 3,4-dichlorobenzaldehyde was dissolved in 10 mL of methanol, 0.617 g (5.714 mmol) of 4-picolylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate, n-hexane, and methanol as a mobile phase, to thereby obtain a yellow liquid of (3,4-Dichloro-benzyl)-pyridin-4-ylmethyl-amine.

Yield: 72%

$^1$H NMR (300 MHz, CDCl$_3$) δ 8.57 (dd, 2H), δ 7.47 (d, J=1.83 Hz, 1H), δ 7.42 (d, J=8.0 Hz, 1H), δ 7.29 (dd, 2H), δ 7.20 (dd, J=8.0 and 1.83 Hz, 1H), δ 3.81 (s, 2H), δ 3.76 (s, 2H), δ 1.75 (b, 1H)

Example 29

Synthesis of Compound 29
(Benzyl-(3,4-dichloro-benzyl)-amine)

After 1 g (5.714 mmol) of 3,4-dichlorobenzaldehyde was dissolved in 10 mL of methanol, 0.612 g (5.714 mmol) of benzylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-yellow liquid of benzyl-(3,4-dichloro-benzyl)-amine.

Yield: 89.1%

$^1$H NMR (300 MHz, CDCl$_3$) δ 7.47 (d, J=2.2 Hz, 1H), δ 8.74 (d, J=8.0 Hz, 1H), δ 8.73 (m, 5H), δ 7.20 (dd, J=8.0 and 1.8 Hz, 1H), δ 3.79 (s, 2H), δ 3.76 (s, 2H), δ 1.60 (b, 1H)

Example 30

Synthesis of Compound 30 ((3,4-Dichloro-benzyl)-(2-pyridin-4-yl-ethyl)-amine)

After 1 g (5.714 mmol) of 3,4-dichlorobenzaldehyde was dissolved in 10 mL of methanol, 0.698 g (5.714 mmol) of 4-(2-Aminoethyl)pyridine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate, n-hexane, and methanol as a mobile phase, to thereby obtain a yellow liquid of (3,4-Dichloro-benzyl)-(2-pyridin-4-yl-ethyl)-amine.

Yield: 76.7%

$^1$H NMR (300 MHz, CDCl$_3$) δ 8.53 (d, 2H), δ 7.39 (m, 2H), δ 7.15 (m, 3H), δ 3.76 (s, 2H), δ 2.91 (m, 2H), δ 2.83 (m, 2H), δ 2.37 (b, 1H)

Example 31

Synthesis of Compound 31 ((3,4-Dichloro-benzyl)-(2-pyridin-3-yl-ethyl)-amine)

After 1 g (5.714 mmol) of 3,4-dichlorobenzaldehyde was dissolved in 10 mL of methanol, 0.698 g (5.714 mmol) of 3-(2-Aminoethyl)pyridine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate, n-hexane, and methanol as a mobile phase, to thereby obtain a yellow liquid of (3,4-Dichloro-benzyl)-(2-pyridin-3-yl-ethyl)-amine.

Yield: 62.24%

$^1$H NMR (300 MHz, CDCl$_3$) δ 8.48 (s, 2H), δ 7.54 (dt, 1H), δ 7.39 (m, 2H), δ 7.26 (m, 1H), δ 7.13 (dd, J=8.4 and 2.1 Hz, 1H), δ 3.76 (s, 2H), δ 2.90 (m, 4H)

Example 32

Synthesis of Compound 32 ((3,4-Dichloro-benzyl)-(2-pyridin-2-yl-ethyl)-amine)

After 1 g (5.714 mmol) of 3,4-dichlorobenzaldehyde was dissolved in 10 mL of methanol, 0.698 g (5.714 mmol) of 2-(2-aminoethyl)pyridine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate, n-hexane, and methanol as a mobile phase, to thereby obtain a dark-yellow liquid of (3,4-Dichloro-benzyl)-(2-pyridin-2-yl-ethyl)-amine.

Yield: 37.3%

$^1$H NMR (300 MHz, CDCl$_3$) δ 8.55 (d, 1H), δ 7.64 (td, J=7.6 and 1.8 Hz, 1H), δ 7.41 (d, J=1.8 Hz 1H), δ 7.37 (d, J=8.0 Hz, 1H), δ 7.18 (m, 3H), δ 3.78 (s, 2H), δ 3.01 (m, 4H)

Example 33

Synthesis of Compound 33 (Cyclopentyl-(3,4-dichloro-benzyl)-amine)

After 1 g (5.714 mmol) of 3,4-dichlorobenzaldehyde was dissolved in 10 mL of methanol, 0.486 g (5.714 mmol) of cyclopentylamine was added thereto and reacted at room temperature for 1 hour. Then, 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-yellow liquid of cyclopentyl-(3,4-dichloro-benzyl)-amine.

Yield: 96%

$^1$H NMR (300 MHz, CDCl$_3$) δ 7.44 (d, J=1.8 Hz, 1H), δ 7.39 (d, J=8.0 Hz, 1H), δ 7.17 (dd, J=8.0 and 1.8 Hz, 1H), δ 3.72 (s, 2H), δ 3.12 (m, J=6.5 Hz, 1H), δ 1.87 (m, 8H)

Example 34

Synthesis of Compound 34 ((3,4-Dichloro-benzyl)-phenethyl-amine)

After 1 g (5.714 mmol) of 3,4-dichlorobenzaldehyde was dissolved in 10 mL of methanol, 0.692 g (5.714 mmol) of 2-phenylethylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of (3,4-Dichloro-benzyl)-phenethyl-amine.

Yield: 87.4%

$^1$H NMR (300 MHz, CDCl$_3$) δ 7.38 (m, 7H), δ 7.12 (dd, J=8.4 and 1.8 Hz, 1H), δ 3.74 (s, 2H), δ 2.89 (m, 4H)

Example 35

Synthesis of Compound 35 (Cyclohexyl-(3,4-dichloro-benzyl)-amine)

After 1 g (5.714 mmol) of 3,4-dichlorobenzaldehyde was dissolved in 10 mL of methanol, 0.566 g (5.714 mmol) of cyclohexylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a yellow liquid of cyclohexyl-(3,4-dichloro-benzyl)-amine.

Yield: 70.2%

$^1$H NMR (300 MHz, CDCl$_3$) δ 7.44 (d, J=1.8 Hz, 1H), δ 7.38 (d, J=8.0 Hz, 1H), δ 7.17 (dd, J=8.0 and 1.8 Hz, 1H), δ 3.76 (s, 2H), δ 2.47 (m, 1H), δ 1.91 (m, 10H)

Example 36

Synthesis of Compound 36 (Cycloheptyl-(3,4-dichloro-benzyl)-amine)

After 1 g (5.714 mmol) of 3,4-dichlorobenzaldehyde was dissolved in 10 mL of methanol, 0.646 g (5.714 mmol) of cycloheptylamine was added thereto and reacted at room temperature for 1 hour. 0.32 g (8.45 mmol) of sodium borohydride was slowly added thereto and stirred for 1 hour. The degree of progress of reaction was confirmed by TLC.

When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a liquid of cycloheptyl-(3,4-dichloro-benzyl)-amine.

Yield: 64%

$^1$H NMR (300 MHz, CDCl$_3$) δ 7.44 (d, J=1.8 Hz, 1H), δ 7.38 (d, J=8.4 Hz, 1H), δ 7.17 (dd, J=8.4 and 1.8 Hz, 1H), δ 3.76 (s, 2H), δ 2.47 (m, 1H), δ 1.91 (m, 12H)

Example 37

Synthesis of Compound 37
(Benzyl-(2-pyridin-2-yl-ethyl)-amine)

After 1 g (9.423 mmol) of benzaldehyde was dissolved in 10 mL of methanol, 1.151 g (9.423 mmol) of 2-(2-aminoethyl)pyridine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-red liquid of benzyl-(2-pyridin-2-yl-ethyl)-amine.

Yield: 87%

$^1$H NMR (300 MHz, CDCl$_3$) δ 8.53 (d, 1H), δ 7.61 (td, J=7.6 and 1.8 Hz, 1H), δ 7.31 (m, 7H), δ 3.83 (s, 2H), δ 3.08 (m, 4H)

Example 38

Synthesis of Compound 38 (2-[(2-Pyridin-2-yl-ethylamino)-methyl]-phenol)

After 1 g (8.189 mmol) of salicylaldehyde was dissolved in 10 mL of methanol, 1.000 g (8.189 mmol) of 2-(2-Aminoethyl)pyridine was added thereto and reacted at room temperature for 1 hour. 0.46 g (12.28 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of 2-[(2-Pyridin-2-yl-ethylamino)-methyl]-phenol.

Yield: 52.5%

$^1$H NMR (300 MHz, CDCl$_3$) δ 8.53 (d, 1H), δ 7.64 (td, J=7.7 and 1.8 Hz, 1H), δ 7.17 (m, 3H), δ 7.00 (d, 1H), δ 6.82 (m, 2H), δ 4.01 (s, 2H), δ 3.13 (m, 4H)

Example 39

Synthesis of Compound 39 ((2-Bromo-benzyl)-(2-pyridin-2-yl-ethyl)-amine)

After 1 g (5.405 mmol) of 2-Bromobenzaldehyde was dissolved in 10 mL of methanol, 0.660 g (5.405 mmol) of 2-(2-Aminoethyl)pyridine was added thereto and reacted at room temperature for 1 hour. 0.30 g (8.10 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-red liquid of (2-Bromo-benzyl)-(2-pyridin-2-yl-ethyl)-amine.

Yield: 31.8%

$^1$H NMR (300 MHz, CDCl$_3$) δ 8.54 (m, 1H), δ 7.62 (td, J=7.6 and 1.8 Hz, 1H), δ 7.53 (dd, J=8.0 and 1.1 Hz, 1H), δ 7.38 (dd, J=7.6 and 1.8 Hz, 1H), δ 7.29 (td, 1H), δ 7.1 (d, J=7.6 Hz, 1H), δ 7.14 (m, 2H), δ 3.90 (s, 2H), δ 3.07 (m, 4H), δ 2.08 (b, 1H)

Example 40

Synthesis of Compound 40 ((3-Bromo-benzyl)-(2-pyridin-2-yl-ethyl)-amine)

After 1 g (5.405 mmol) of 3-bromobenzaldehyde was dissolved in 10 mL of methanol, 0.660 g (5.405 mmol) of 2-(2-aminoethyl)pyridine was added thereto and reacted at room temperature for 1 hour. 0.30 g (8.10 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-yellow liquid of (3-Bromo-benzyl)-(2-pyridin-2-yl-ethyl)-amine.

Yield: 40.5%

$^1$H NMR (300 MHz, CDCl$_3$) δ 8.54 (d, J=4.3 Hz, 1H), δ 7.63 (td, J=7.7 and 1.8 Hz, 1H), δ 7.46 (s, 1H), δ 7.37 (d, J=7.7 Hz, 1H), δ 7.23 (m, 4H), δ 3.79 (s, 2H), δ 3.06 (m, 4H)

Example 41

Synthesis of Compound 41 ((4-Bromo-benzyl)-(2-pyridin-2-yl-ethyl)-amine)

After 1 g (5.405 mmol) of 4-bromobenzaldehyde was dissolved in 10 mL of methanol, 0.660 g (5.405 mmol) of 2-(2-aminoethyl)pyridine was added thereto and reacted at room temperature for 1 hour. 0.30 g (8.10 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-red liquid of (4-Bromo-benzyl)-(2-pyridin-2-yl-ethyl)-amine.

Yield: 68.3%

$^1$H NMR (300 MHz, CDCl$_3$) δ 8.53 (d, J=4.7 Hz, 1H), δ 7.62 (td, J=7.7 and 1.8 Hz, 1H), δ 7.43 (d, 2H), δ 7.19 (m, 4H), δ 3.78 (s, 2H), δ 3.06 (m, 4H)

Example 42

Synthesis of Compound 42
(Benzyl-cycloheptyl-amine)

After 1 g (9.423 mmol) of benzaldehyde was dissolved in 10 mL of methanol, 1.066 g (9.423 mmol) of cycloheptylamine was added thereto and reacted at room temperature for 1 hour. 0.53 g (14.13 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a pale-yellow liquid of benzyl-cycloheptyl-amine.

Yield: 73.2%

$^1$H NMR (300 MHz, CDCl$_3$) δ 7.37 (m, 5H), δ 3.77 (s, 2H), δ 2.69 (m, 1H), δ 1.89 (m, 12H)

Example 43

Synthesis of Compound 43
(Benzyl-cyclohexyl-amine)

After 1 g (9.423 mmol) of benzaldehyde was dissolved in 10 mL of methanol, 0.934 g (9.423 mmol) of cyclohexylamine was added thereto and reacted at room temperature for 1 hour. 0.53 g (14.13 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of benzyl-cyclohexyl-amine.

Yield: 61.8%

$^1$H NMR (300 MHz, CDCl$_3$) δ 7.32 (m, 5H), δ 3.77 (s, 2H), δ 3.16 (m, 1H), δ 1.90 (m, 10H)

Example 45

Synthesis of Compound 45
((3,4-Dichloro-benzyl)-indan-1-yl-amine)

After 1 g (5.714 mmol) of 3,4-dichlorobenzaldehyde was dissolved in 10 mL of methanol, 0.761 g (5.714 mmol) of 1-aminoindan was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a white liquid of (3,4-dichloro-benzyl)-indan-1-yl-amine.

Yield: 61.2%

$^1$H NMR (300 MHz, CDCl$_3$) δ 7.52 (d, J=1.8 Hz, 1H), δ 7.39 (m, 2H), δ 7.25 (m, 4H), δ 4.28 (t, J=6.5 Hz, 1H), δ 3.91 (m, 2H), δ 3.00 (m, 1H), δ 2.87 (m, 1H), δ 2.46 (m, 1H), δ 1.87 (m, 1H)

Example 46

Synthesis of Compound 46
(Cyclobutyl-(3,4-dichloro-benzyl)-amine)

After 1 g (5.714 mmol) of 3,4-dichlorobenzaldehyde was dissolved in 10 mL of methanol, 0.406 g (5.714 mmol) of cyclobuthylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of cyclobutyl-(3,4-dichloro-benzyl)-amine.

Yield: 45.7%

$^1$H NMR (300 MHz, CDCl$_3$) δ 7.43 (d, J=2.19 Hz, 1H), δ 7.38 (d, J=8.4 Hz, 1H), δ 7.16 (dd, J=8.4 and 2.19 Hz, 1H), δ 3.65 (s, 2H), δ 3.30 (m, 1H), δ 2.25 (m, 2H), δ 1.73 (m, 4H)

Example 47

Synthesis of Compound 47
(Cyclooctyl-(3,4-dichloro-benzyl)-amine)

After 1 g (5.714 mmol) of 3,4-dichlorobenzaldehyde was dissolved in 10 mL of methanol, 0.727 g (5.714 mmol) of cyclooctylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of cyclooctyl-(3,4-dichloro-benzyl)-amine.

Yield: 73.5%

$^1$H NMR (300 MHz, CDCl$_3$) δ 7.43 (d, J=1.8 Hz, 1H), δ 7.38 (d, J=8.0 Hz, 1H), δ 7.17 (dd, J=8.0 and 1.8 Hz, 1H), δ 3.72 (s, 2H), δ 2.70 (m, 1H), δ 1.80 (m, 14H)

Example 48

Synthesis of Compound 48 (N'-(3,4-Dichloro-benzyl)-N, N-diethyl-propane-1,3-diamine.2HCl)

After 1 g (3.457 mmol) of N'-(3,4-dichlorobenzyl)-N,N-diethyl-propane-1,3-diamine was dissolved in 20 mL of methylene chloride, hydrogen chloride (7 mmol) was added thereto and stirred for 10 minutes. When a solid was formed, the resulting product was filtered to thereby obtain a salt of N'-(3,4-dichlorobenzyl)-N,N-diethyl-propane-1,3-diamine.2HCl (i.e., a salt of Compound 1).

Yield: 100%

$^1$H NMR (300 MHz, DMSO-$d_6$) δ 10.72 (b, 1H), δ 9.86 (b, 2H), δ 7.97 (d, J=1.47 Hz 1H), δ 7.72 (d, J=8.07 Hz 1H), δ 7.63 (dd, J=8.07 and 1.47 Hz 1H), δ 4.15 (s, 2H), δ 3.15 (m, 8H), δ 2.18 (m, 2H), δ 1.24 (t, J=6.96 Hz, 6H)

Example 49

Synthesis of Compound 49 (N,N-Dibutyl-N'-(3,4-dichlorobenzyl)ethane-1,2-diamine)

After 1 g (5.714 mmol) of 3,4-dichlorobenzaldehyde was dissolved in 10 mL of methanol, 0.984 g (5.714 mmol) of N,N-dibutylethylenediamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid N,N-dibutyl-N'-(3,4-dichlorobenzyl)ethane-1,2-diamine.

Yield: 86.3%

$^1$H NMR (300 MHz, CDCl$_3$) δ 7.43 (d, J=1.83 Hz, 1H), δ 7.39 (d, J=8.04 Hz, 1H), δ 7.17 (dd, J=1.83 and 8.04 Hz, 1H), δ 3.74 (s, 2H), δ 2.62 (m, 4H), δ 2.38 (t, J=6.96 Hz, 4H), δ 1.46 (m, 8H), δ 0.92 (t, J=6.96 Hz, 6H)

Example 50

Synthesis of Compound 50 (N,N-Dibutyl-N'-(3,4-dichlorobenzyl)propane-1,3-diamine)

After 1 g (5.714 mmol) of 3,4-dichlorobenzaldehyde was dissolved in 10 mL of methanol, 1.064 g (5.714 mmol) of 3-(dibutylamino)propylamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of N,N-dibutyl-N'-(3,4-dichlorobenzyl)propane-1,3-diamine.

Yield: 70.4%

$^1$H NMR (300 MHz, CDCl$_3$) δ 7.43 (d, J=1.83 Hz, 1H), δ 7.38 (d, J=8.07 Hz, 1H), δ 7.17 (dd, J=1.83 and 8.07 Hz, 1H), δ 3.72 (s, 2H), δ 6.65 (t, J=6.6 Hz, 2H), δ 2.46 (m, 6H), δ 1.69 (m, 2H), δ 1.45 (m, 10H), δ 0.93 (t, J=7.32 Hz, 1H)

Example 51

Synthesis of Compound 51 (2-[[3-(3,4-Dichlorobenzylamino)propyl]-(2-hydroxyethyl)amino]ethanol)

After 1 g (5.714 mmol) of 3,4-dichlorobenzaldehyde was dissolved in 10 mL of methanol, 0.926 g (5.714 mmol) of N-(3-aminopropyl)diethanolamine was added thereto and reacted at room temperature for 1 hour. 0.32 g (8.45 mmol) of sodium borohydride was slowly added thereto and stirred for 1 hour. The degree of progress of reaction was confirmed by TLC. When the reaction did not proceed further, 40 mL of water was added to the mixture, and the mixture was extracted twice with 30 mL of methylene chloride. The extracts were combined, dried with anhydrous magnesium sulfate to remove water, and then distilled under reduced pressure. The resulting reaction product was separated using a silica gel-filled column with a mixed solvent of ethyl acetate and n-hexane as a mobile phase, to thereby obtain a colorless liquid of 2-[[3-(3,4-Dichlorobenzylamino)propyl]-(2-hydroxyethyl)amino]ethanol.

Yield: 64.1%

$^1$H NMR (300 MHz, CDCl$_3$) δ 7.42 (m, 2H), δ 7.19 (dd, J=2.19 and 8.43 Hz, 1H), δ 3.71 (s, 2H), δ 3.63 (t, J=5.13, 4H), δ 2.73 (m, 8H), δ 1.70 (m, 2H)

Evaluation Example 1 (Evaluation of Microalgae-Destroying Effect by IC$_{50}$ Measurement)

Measurement of the Half-Maximal Inhibitory Concentration (IC$_{50}$)

To investigate whether Compounds 1 to 3, 5 to 10, 12, 13, 17 to 43, and 45 to 51 synthesized in Examples 1 to 3, 5 to 10, 12, 13, 17 to 43, and 45 to 51 had an microalgae-killing effect, flagellates of the species *Chattonella Marina*, the species *Heterosigma circularisquama*, the species *Cochlodinium Polykrikoides*, and the species *Heterosigma akashiwo*, and blue-green algae of the genus *Microcystis* were treated with Compounds 1 to 3, 5 to 10, 12, 13, 17 to 43, and 45 to 51 synthesized in Examples 1 to 3, 5 to 10, 12, 13, 17 to 43, and 45 to 51. After the treatment, microalgae-destroying effects of Compounds 1 to 3, 5 to 10, 12, 13, 17 to 43, and 45 to 51 synthesized in Examples 1 to 3, 5 to 10, 12, 13, 17 to 43, and 45 to 51 were analyzed by measuring the half-maximal inhibitory concentration (IC$_{50}$), which represents the concentration of each compound that is required for 50% inhibition of a total microalgae cell count.

The IC$_{50}$ value was obtained according to Equation 1:

$$Y = D + \frac{(A-D)}{\left(1+\left(\frac{X}{C}\right)^B\right)} \quad \text{<Equation 1>}$$

In Equation 1, Y represents an algicidal activity (%) at an inoculation concentration of each compound, A and D represent a maximum algicidal activity (%) and a minimum algicidal activity (%), respectively, at an inoculation concentration of each compound, C represents an IC$_{50}$ value within an inoculation concentration range, and B represents Hillslope (i.e., a slope of the four-parameter logistic curve which will be described below).

The algicidal activity of each compound was calculated using Equation 2:

$$\text{Algicidal activity (\%)} = (1 - Tt/Ct) \times 100 \qquad \text{<Equation 2>}$$

In Equation 2, T (treatment group) and C (control group) represent algae densities in cell counts when each compound was inoculated and was not inoculated, respectively, and t represents the number of days which had passed after the inoculation.

First, the above-listed microalgae were cultured in a culture flask at a temperature of about 20° C. under light conditions, and a medium used was Guillard's f/2 medium which is commonly used in the art (Guillard R R L and Keller M D. *Culturing dinoflagellates*. In: Spector (Ed.), Dinoflagellates. New York: Academic Press; 1984, 391442).

After the cultured microalgae were transferred onto a 24-well plate, *Chattonella Marina*, *Heterosigma circularisquama*, *Cochlodinium Polykrikoides*, and *Heterosigma akashiwo*, which were in an exponential growth phase, were treated with Compounds 1 to 3, 5 to 10, 12, 13, 17 to 43, and 45 to 47 synthesized in Examples 1 to 3, 5 to 10, 12, 13, 17 to 43, and 45 to 47 at concentrations of 0.1 uM, 0.2 uM, 0.5 uM, 1 uM, 2 uM, and 5 uM, and then cultured for 1 day.

*Microcystis aeruginosa* was treated with Compounds 1 to 3, 5 to 10, 12, 13, 17 to 43, and 45 to 51 synthesized in Examples 1 to 3, 5 to 10, 12, 13, 17 to 43, and 45 to 51 at concentrations of 0.1 uM, 0.2 uM, 0.5 uM, 1 uM, 2 uM, 5 uM, 10 uM, 15 uM, and 20 uM and then cultured for 5 days.

Control groups were not treated with any of the compounds synthesized in the above-identified examples. After incubation, the number of cells of each alga was counted using a Burker-Tukr hemocytometer, and $IC_{50}$ values were calculated according to Equation 1 using SigmaPlot Version 11.2 software (Standard curve: the four-parameter logistic curve). The results are shown in Tables 1 and 2.

TABLE 1

| 3,4-dichlorobenzylamines | Compound | *Chattonella Marina* | *Heterocapsa Circularisquama* | *Cochlodinium Polykrikoides* | *Heterosigma Akashiwo* | *Microcystis aeruginosa* |
|---|---|---|---|---|---|---|
| Example 1 | 1 | 2.9 | 1.76 | 2.3 | 1.58 | 4.89 |
| Example 2 | 2 | 2.6 | 3.4 | 0.327 | 1.3 | 0.57 |
| Example 3 | 3 | >5 | 3.1 | >5 | 2.25 | 8.41 |
| Example 5 | 5 | >5 | >5 | >5 | 1.3 | 14.17 |
| Example 6 | 6 | >5 | 4.8 | 4.417 | 1.3 | 8.64 |
| Example 7 | 7 | 2 | 1.5 | 1.53 | 0.28 | 11.61 |
| Example 8 | 8 | 0.81 | 3.3 | 0.29 | 1.26 | 0.09 |
| Example 17 | 17 | >5 | >5 | >5 | 1.18 | >20 |
| Example 18 | 18 | 2.67 | >5 | 4.38 | 0.73 | 11.83 |
| Example 19 | 19 | 3.5 | >5 | 4.14 | 1.27 | 13.8 |
| Example 20 | 20 | 3.16 | 2.86 | 3.516 | 0.44 | >20 |
| Example 21 | 21 | >5 | 3.3 | 3.6 | 1.28 | 9.66 |
| Example 23 | 23 | >5 | >5 | >5 | 1.54 | 11.07 |
| Example 25 | 25 | >5 | 2.83 | 4 | 1.19 | 11.11 |
| Example 26 | 26 | 3.4 | >5 | >5 | 0.72 | >20 |
| Example 27 | 27 | >5 | 3.55 | 2 | 0.79 | >20 |
| Example 28 | 28 | >5 | >5 | >5 | 2.28 | 15.24 |
| Example 29 | 29 | 3.46 | 3.23 | 2.75 | 0.6 | 14.38 |
| Example 30 | 30 | 3.47 | 1.91 | 2.7 | 0.42 | >20 |
| Example 31 | 31 | 3.5 | 1.6 | 0.424 | 0.59 | >20 |
| Example 32 | 32 | 0.31 | 1.05 | 0.5 | 0.18 | 19.58 |
| Example 33 | 33 | 0.32 | 1.04 | 0.36 | 0.243 | 19.47 |
| Example 34 | 34 | 0.46 | 1.5 | 0.875 | 0.12 | 5.97 |
| Example 35 | 35 | 0.29 | 1.14 | 0.15 | 0.218 | 14.59 |
| Example 36 | 36 | 0.25 | 0.69 | 0.15 | 0.263 | 3.09 |
| Example 45 | 45 | 1.44 | 2 | 0.31 | 1.14 | >20 |
| Example 46 | 46 | 1.13 | 3.08 | 1.667 | 0.482 | 15.79 |
| Example 47 | 47 | 0.5 | 1.19 | 0.1 | 0.34 | 14.97 |
| Example 48 | 48 | — | — | — | — | 0.78 |
| Example 49 | 49 | — | — | — | — | 0.88 |
| Example 50 | 50 | — | — | — | — | 0.54 |
| Example 51 | 51 | — | — | — | — | 2.27 |

TABLE 2

| | Compound | *Chattonella Marina* | *Heterocapsa Circulariaquama* | *Cochlodinium Polykrikoides* | *Heterosigma Akashiwo* | *Microcystis aeruginosa* |
|---|---|---|---|---|---|---|
| 3,4-dichlorobenzamides | | | | | | |
| Example 9 | 9 | >5 | 1.97 | 4.55 | 1.85 | 0.97 |
| Example 10 | 10 | >5 | >5 | >5 | 1.63 | >5 |
| Example 12 | 12 | >5 | >5 | >5 | 1.55 | >5 |
| Example 13 | 13 | 4.5 | 5 | 2.22 | 2.27 | >5 |
| Benzylamines | | | | | | |
| Example 37 | 37 | 0.34 | >5 | >5 | 0.13 | >5 |
| Example 42 | 42 | 0.52 | >5 | >5 | 0.15 | >5 |
| Example 43 | 43 | >5 | >5 | >5 | 0.67 | >5 |

TABLE 2-continued

| Compound | | Chattonella Marina | Heterocapsa Circulariaquama | Cochlodinium Polykrikoides | Heterosigma Akashiwo | Microcystis aeruginosa |
|---|---|---|---|---|---|---|
| 2-hydroxybenzylamines | | | | | | |
| Example 38 | 38 | 0.91 | >5 | >5 | 0.13 | >5 |
| n-bromobenzylamines | | | | | | |
| Example 39 | 39 | 1.12 | >5 | >5 | 0.28 | >5 |
| Example 40 | 40 | 0.74 | >5 | 3.5 | 0.57 | >5 |
| Example 41 | 41 | 0.72 | >5 | >5 | 0.14 | >5 |
| Phenyl propenones | | | | | | |
| Example 22 | 22 | >5 | >5 | 1.66 | 3.67 | >5 |
| Example 24 | 24 | >5 | >5 | 1.33 | 1.7 | >5 |

Referring to Tables 1 and 2, Compounds 1 to 3, 5 to 10, 12, 13, 17 to 43, and 45 to 51 synthesized in Examples 1 to 3, 5 to 10, 12, 13, 17 to 43, and 45 to 51 were found to have an algicidal effect on at least one of *Chattonella Marina*, *Heterosigma circularisquama*, *Cochlodinium Polykrikoides*, *Heterosigma akashiwo*, and *Microcystis aeruginosa*.

For reference, a $IC_{50}$ value greater than 5 means nearly zero microalgae-filling effect.

Evaluation Example 2 (Evaluation of Microalgae-Destroying Effect by Surviving Cells Rate Measurement)

Microalgae-Destroying Effect of Compound 35

To investigate a microalgae-destroying effect of Compound 35 synthesized in Example 35, culture solutions of *Chattonella Marina*, *Heterosigma Circularisquama*, *Cochlodinium Polykrikoides*, and *Heterosigma akashiwo* (40 mL, initial population number: about $15 \times 10^4$ to $18 \times 10^4$/mL) were each treated with a solution of Compound 35 (1 µM in dimethyl sulfoxide (DMSO) and f/2 medium) for about 6 hours. A microalgae culture solution not treated with a solution of Compound 35 was used as a control group. After the treatment, viable cell ratios of the microalgae with respect to time were measured, and it was also observed whether the microalgae were destroyed. The results are shown in FIGS. 1 and 2.

Referring to FIG. 1, the viable cell ratios of the microalgae were found to have decreased with time, indicating that Compound 35 had a high algicidal effect on the four kinds of the microalgae.

Figure 2:
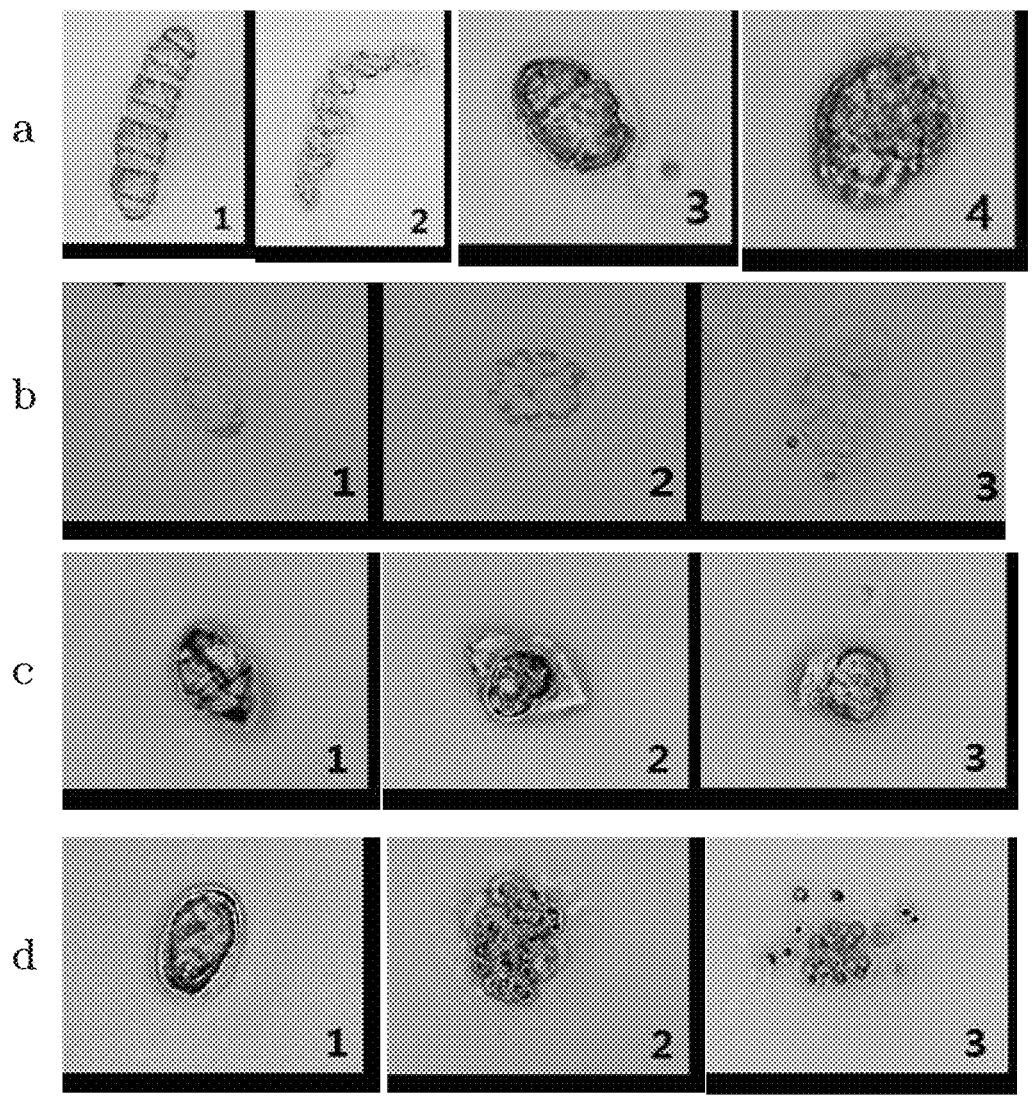
FIG. 2 shows microscope images as results of the treatment of the four microalgae with Compound 35 in Evaluation Example 2, wherein (a), (b), (c) and (d) represent *Cochlodinium Polykrikoides*, *Heterosigma*, *Heterosigma circularisquama*, and *Chattonella Marina*, respectively; and (a)-1, (a)-3, (b)-1, (c)-1, and (d)-1 represent control groups of the microalgae not treated with Compound 35.

FIG. 2 shows microscope images of the four microalgal species observed after the treatment with Compound 35, wherein (a), (b), (c), and (d) represent microscope images of *Cochlodinium Polykrikoides*, *Heterosigma akashiwo*, *Heterosigma circularisquama*, and *Chattonella Marina*, respectively, and (a)-1, (a)-3, (b)-1, (c)-1, and (d)-1 represent control groups not treated with Compound 35.

Referring to FIG. 2, the four microalgal species treated with Compound 35 were found to have been destroyed, as shown in (a)-2, (a)-4, (b)-2, (b)-3, (c)-2, (c)-3, (d)-2, and (d)-3 of FIG. 2.

Microalgae-Destroying Effect of Compound 2

To investigate a microalgae-destroying effect of Compound 2 synthesized in Example 2, culture solutions of *Microcystis aeruginosa* (40 mL; initial population number: $100 \times 10^4$/mL) in DMSO and BG11 medium were each treated with solutions of Compound 2 at 0.5 µM, 1 µM, and 2 µM and observed for 2 days. A culture solution of the microalgae not treated with a solution of Compound 2 was used as a control group. The results are shown in FIG. 3.

Figure 3:
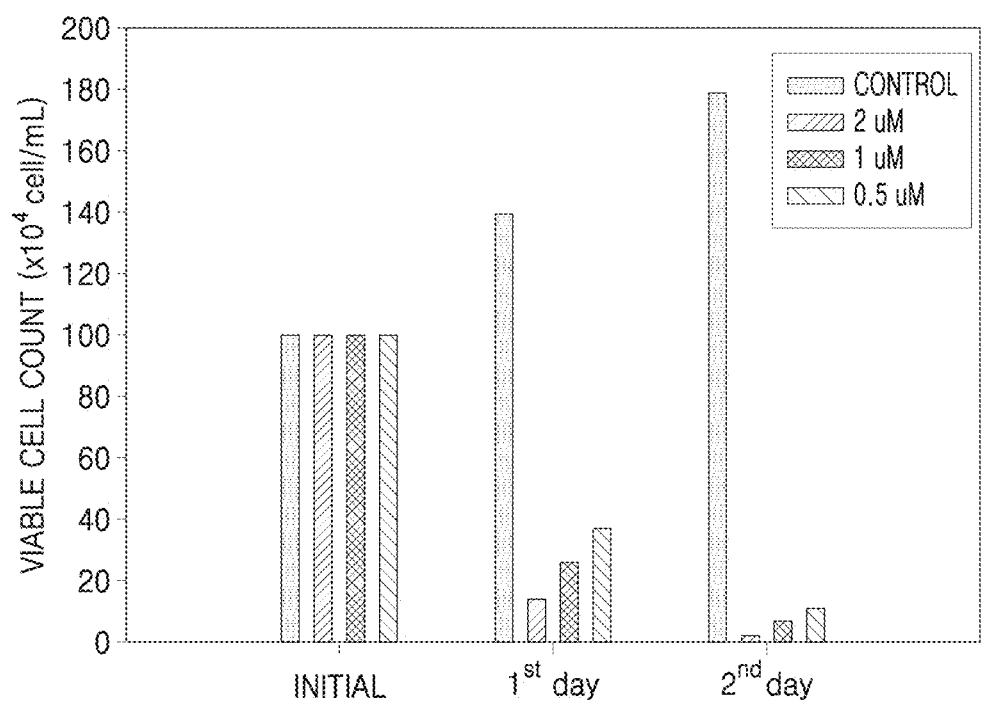
FIG. 3 shows viable cell counts of *Microcystis* with respect to time when *Microcystis* was treated with Compound 2 in Evaluation 2.

Referring to FIG. 3, Compound 2 was found to have a high algicidal effect on the *Microcystis*.

Evaluation Example 3 (Acute Toxicity Test on *Daphnia magna*)

An acute toxicity test was performed on *Daphnia magna* (water flea) using Compounds 33 and 35 synthesized in Examples 33 and 35. In particular, culture solutions of *Daphnia magna* (200 mL, 30 animals) in DMSO and M4 medium were treated with solutions of Compounds 33 and 35 at 5 µM, 10 µM, and 15 µM for 2 days. The results are shown in FIG. 4.

Figure 4:
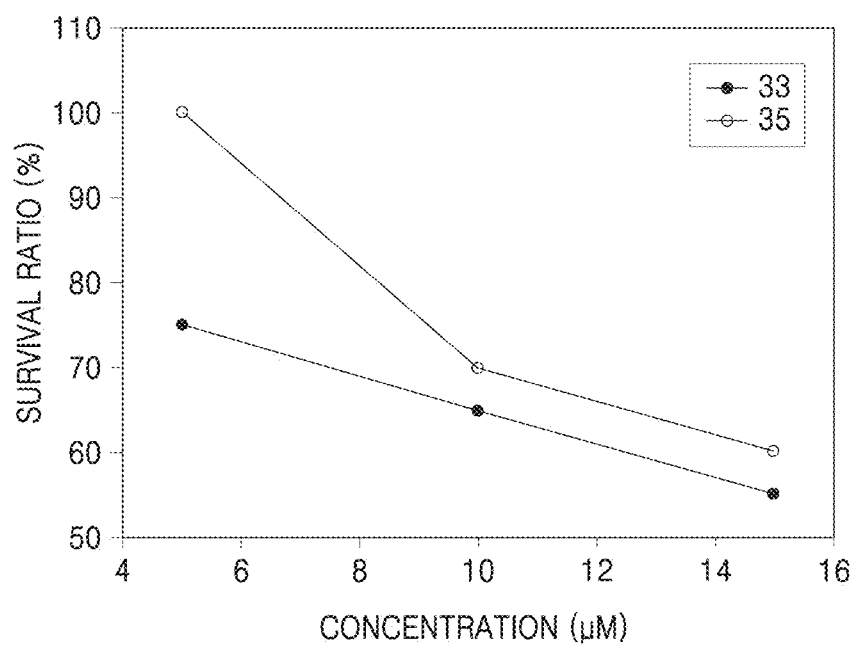
FIG. 4 shows a result of a toxicity test performed on *Daphnia magna* according to Evaluation Example 3 using Compounds 33 and 35.

Referring to FIG. 4, when treated with the solutions of Compounds 33 and 25 even at a concentration of 5 µM, survival ratios of the microalgae were found to be about 100% and about 75%, respectively. This concentration level of each compound solution is 5 times 1 µM, wherein 1 µM is the concentration of each compound required for 50% inhibition of a total cell count of the flagellates (refer to $IC_{50}$ values in Table 1). Therefore, it was found that using solutions of Compounds 33 and 35 at a concentration sufficient to effectively destroy microalgae was not detrimental to the survival of the *Daphnia magna*.

Evaluation Example 4 (Acute Toxicity Test on *Danio rerio*)

An acute toxicity test on *Danio rerio* (zebrafish) was performed using compounds 33 and 35 synthesized in Examples 33 and 35. In particular, 2-cm-sized *Danio rerio*, which had been 3 months since hatching, was acclimatized for 14 days before the start of the experiment. The *Danio rerio* were feed twice a day during the acclimation period. Next, solutions of Compounds 33 and 25 were prepared at concentrations of 0, 5, 10, 15, 20, 25, and 30 µM. Culture solutions of the *Danio rerio* (10 L, initial population number: 10 zebrafish in total (1 zebrafish/L)) were treated for 2 weeks with the solutions of Compounds 33 and 35 at different concentrations to thereby perform the acute toxicity test. The results are shown in FIG. 5.

Figure 5:
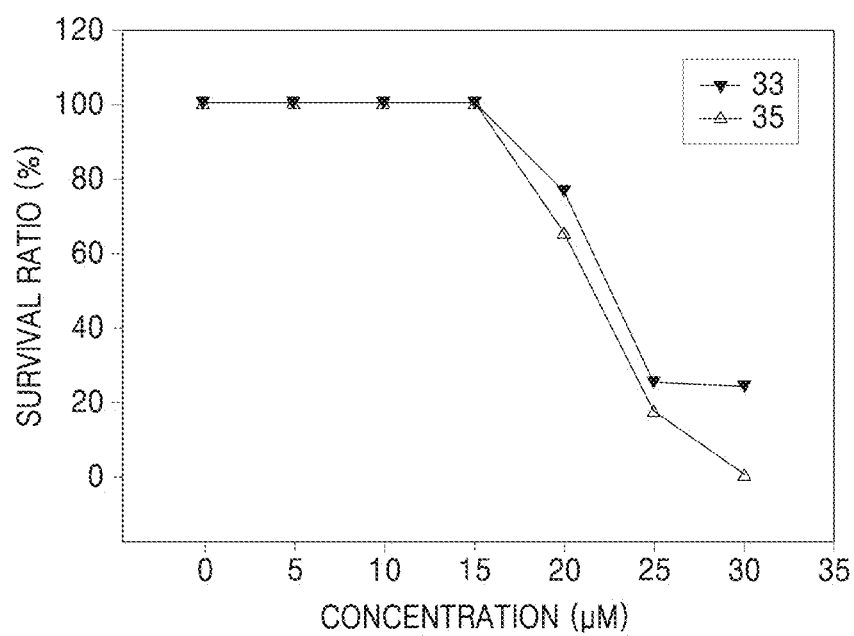
FIG. 5 shows a result of a toxicity test performed on *Danio rerio* according to Evaluation Example 4 using Compounds 33 and 35.

Referring to FIG. 5, when treated with the solutions of Compounds 33 and 35 even at a concentration of 15 µM, survival ratios of the *Danio rerio* were found to be 100%. This concentration level of each compound solution is 15 times 1 µM, wherein 1 µM is the concentration of each compound required for 50% inhibition of a total cell count of the flagellates (refer to $IC_{50}$ values in Table 1). Therefore, it was found that using solutions of Compounds 33 and 35 at a concentration that is sufficient to effectively destroy microalgae was not detrimental to the survival of the *Danio rerio*.

While one or more embodiments have been described with reference to the appended drawings, it should be understood that the embodiments described herein should be considered in a descriptive sense only and not for purposes of limitation and that various changes in form and details may be made therein without departing from the spirit and scope as defined by the following claims. Therefore, the scope of the disclosure is defined not by the detailed description of the disclosure but by the appended claims and equivalents thereof.

The invention claimed is:

1. A method of destroying microalgae or mosses, the method comprising treating a natural water system, an artificial water system, an area in which green or red tide is occurring, or an area in which green or red tide is expected to occur with a composition comprising an effective amount of compound 2 or a salt thereof:

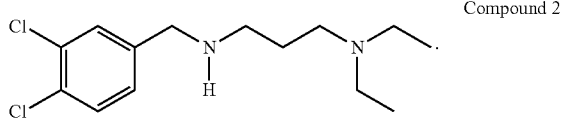 [SMILES: CCN(CC)CCCNCc1ccc(Cl)c(Cl)c1]

Compound 2

2. The method of claim 1, wherein the microalgae are selected from blue-green algae, diatoms, green algae, euglenoid algae, *flagellates*, yellow-green algae, Dinophyta, raphidophytes, and algae with a biodiesel-producing ability.

3. The method of claim 1, wherein the mosses are selected from the class Takakiopsida, the class Sphagnopsida, the class Andreaeopsida, the class Andreaeobryopsida, the class Oedipodiopsida, the class Polytrichopsida, the class Tetraphidopsida, and the class Bryopsida.

4. The method of claim 2, wherein the blue-green algae are selected from the genus Microcystis, the genus *Anabaena*, the genus Aphanizomenon, and the genus Oscillatoria.

5. The method of claim 2, wherein the diatoms are selected from the genus Synedra, the genus Asterionella, the genus Cyclotella, the genus Melosira, Skeletonema *costatum*, the genus *Chaetoceros*, the genus *Thalassiosira*, the genus Leptocylindrus, the genus *Nitzschia*, the genus Cylindrotheca, the genus Eucampia, and the genus Odontella.

6. The method of claim 2, wherein the green algae are selected from the genus *Closterium*, the genus Pediastrum, and the genus *Scenedesmus*.

7. The method of claim 2, wherein the euglenoid algae are of the genus Trachelomonas or the genus *Euglena*.

8. The method of claim 2, wherein the *flagellates* are selected from the genus Peridinium, the genus Heterosigma, the genus Heterocapsa, the genus Cochlodinium, the genus Prorocentrum, the genus Ceratium, the genus Noctiluca, the genus Scrippsiella, the genus Dinophysis, the genus *Alexandrium*, the genus Eutreptiella, the genus Pfiesteria, the genus Chattonella, the genus Emiliania, and the genus Gymnodinium.

9. The method of claim 2, wherein the yellow-green algae are of the genus Uroglena.

10. The method of claim 2, wherein the Dinophyta and the raphidophytes are selected from the genus Heterosigma, the genus Heterocapsa, the genus Cochlodinium, the genus Prorocentrum, the genus Ceratium, the genus Noctiluca, the genus Scrippsiella, the genus Dinophysis, the genus Alexandrium, the genus Eutreptiella, the genus Pfiesteria, the genus Chattonella, the genus Emiliania, and the genus Gymnodinium.

11. The method of claim 2, wherein the algae with a biodiesel-producing ability is selected from the genus Pseudochoricystis, the genus *Botryococcus*, and the genus *Dunaliella*.

12. The method of claim 1, wherein the natural water system is selected from water reservoirs, lakes, or rivers and the artificial water system is selected from aquafarms, fishing spots, cultivation facilities, water zone in golf courses, or water storage tanks.

* * * * *